(12) United States Patent
Froggatt et al.

(10) Patent No.: US 7,948,633 B2
(45) Date of Patent: May 24, 2011

(54) COMPENSATING FOR TIME VARYING PHASE CHANGES IN INTERFEROMETRIC MEASUREMENTS

(75) Inventors: Mark Froggatt, Blacksburg, VA (US); Dawn K. Gifford, Blacksburg, VA (US)

(73) Assignee: Luna Innovations Inc., Roanoke, VA (US)

( * ) Notice: Subject to any disclaimer, the term of this patent is extended or adjusted under 35 U.S.C. 154(b) by 0 days.

(21) Appl. No.: 12/805,879

(22) Filed: Aug. 23, 2010

(65) Prior Publication Data

US 2010/0321702 A1    Dec. 23, 2010

Related U.S. Application Data

(62) Division of application No. 11/792,082, filed as application No. PCT/US2005/045002 on Dec. 13, 2005.

(60) Provisional application No. 60/635,440, filed on Dec. 14, 2004, provisional application No. 60/659,866, filed on Mar. 10, 2005.

(51) Int. Cl.
*G01B 9/02* (2006.01)

(52) U.S. Cl. ...................................................... 356/479

(58) Field of Classification Search .................. 356/73.1, 356/477, 497, 507, 511, 512, 520
See application file for complete search history.

(56) References Cited

U.S. PATENT DOCUMENTS

| | | | |
|---|---|---|---|
| 4,858,142 A * | 8/1989 | Jenq et al. | ......................... 702/71 |
| 6,097,194 A * | 8/2000 | Zwemstra et al. | ............. 324/615 |
| 6,252,222 B1 | 6/2001 | Kasapi et al. | |
| 6,559,946 B2 * | 5/2003 | Davidson et al. | .............. 356/450 |
| 6,900,895 B2 | 5/2005 | Van Wiggeren | |
| 6,900,897 B2 * | 5/2005 | Froggatt | ......................... 356/477 |
| 6,928,638 B2 * | 8/2005 | Parvathala et al. | ............. 717/124 |
| 7,057,714 B2 | 6/2006 | Fredin et al. | |
| 7,088,455 B1 * | 8/2006 | Kirkpatrick et al. | .......... 356/502 |

(Continued)

FOREIGN PATENT DOCUMENTS

JP    2001-255354    9/2001

OTHER PUBLICATIONS

Ly-Gagnon, et al., "Coherent Detection of Optical Quadrature Phase-Shift Keying Signals with Carrier Phase Estimation," Jan. 1, 2006, J. of Lightwave Tech., vol. 24, No. 1, pp. 13-21.*
U.S. Appl. No. 11/792,082, filed Jun. 1, 2007; Inventor: Froggatt et al.
International Preliminary Report on Patentability mailed Jun. 28, 2007 in corresponding PCT Application PCT/US2005/045002.

(Continued)

*Primary Examiner* — Gregory J Toatley
*Assistant Examiner* — Scott M Richey
(74) *Attorney, Agent, or Firm* — Nixon & Vanderhye P.C.

(57) ABSTRACT

An optical device under test (DUT) is interferometrically measured. The DUT can include one or more of an optical fiber, an optical component, or an optical system. First interference pattern data for the DUT is obtained for a first path to the DUT, and second interference pattern data for the DUT is obtained for a second somewhat longer path to the DUT. Because of that longer length, the second interference pattern data is delayed in time from the first interference pattern data. A time varying component of the DUT interference pattern data is then identified from the first and second interference pattern data. The identified time varying component is used to modify the first or the second interference pattern data to compensate for the time-varying phase caused by vibrations, etc. One or more optical characteristics of the DUT may then be determined based on the modified interference pattern data.

23 Claims, 27 Drawing Sheets

U.S. PATENT DOCUMENTS

| | | |
|---|---|---|
| 7,110,119 B2 | 9/2006 | Maestle |
| 7,202,941 B2 * | 4/2007 | Munro .................. 356/5.01 |
| 7,505,197 B2 * | 3/2009 | Sugaya et al. ............. 359/334 |
| 7,538,883 B2 * | 5/2009 | Froggatt .................. 356/477 |
| 7,633,627 B2 * | 12/2009 | Choma et al. ............. 356/479 |
| 7,649,634 B2 * | 1/2010 | Wan .................. 356/504 |
| 2009/0103100 A1 * | 4/2009 | Froggatt et al. ............. 356/477 |
| 2009/0129788 A1 * | 5/2009 | Seimetz .................. 398/208 |
| 2009/0317092 A1 * | 12/2009 | Nakashima et al. ......... 398/204 |
| 2010/0054759 A1 * | 3/2010 | Oda et al. ................ 398/202 |
| 2010/0080560 A1 * | 4/2010 | Mertz .................. 398/76 |
| 2010/0260504 A1 * | 10/2010 | Takahara ................ 398/152 |

OTHER PUBLICATIONS

Written Opinion of the International Searching Authority for International Application No. PCT/US2005/045002 dated Jan. 8, 2007.

Summary of Japanese official action, May 14, 2010 in corresponding Japanese Application No. 2007-545714.

International Search Report for PCT/US05/45002 mailed Jan. 8, 2007.

Written Opinion for PCT/US05/45002 mailed Jan. 8, 2007 (7 pages).

Office Action mailed Sep. 28, 2010 in co-pending U.S. Appl. No. 11/792,082.

* cited by examiner

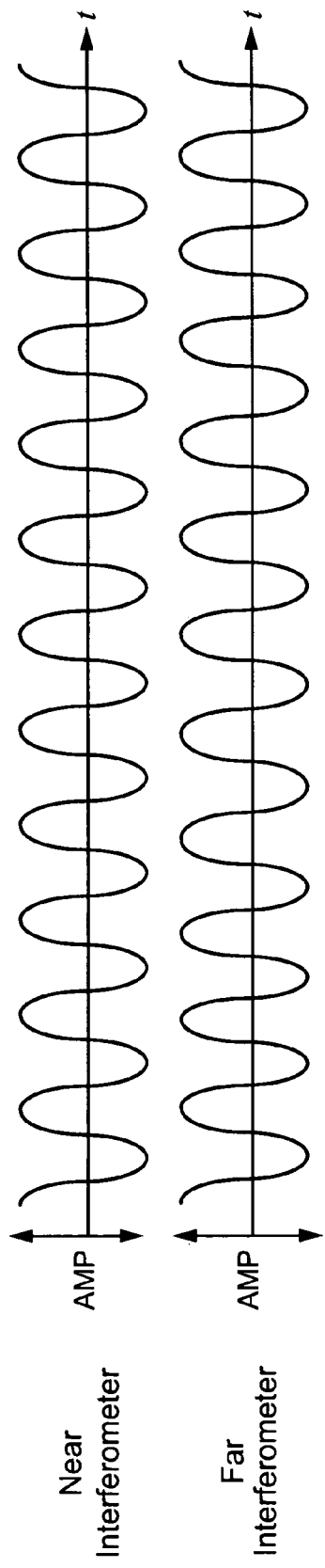
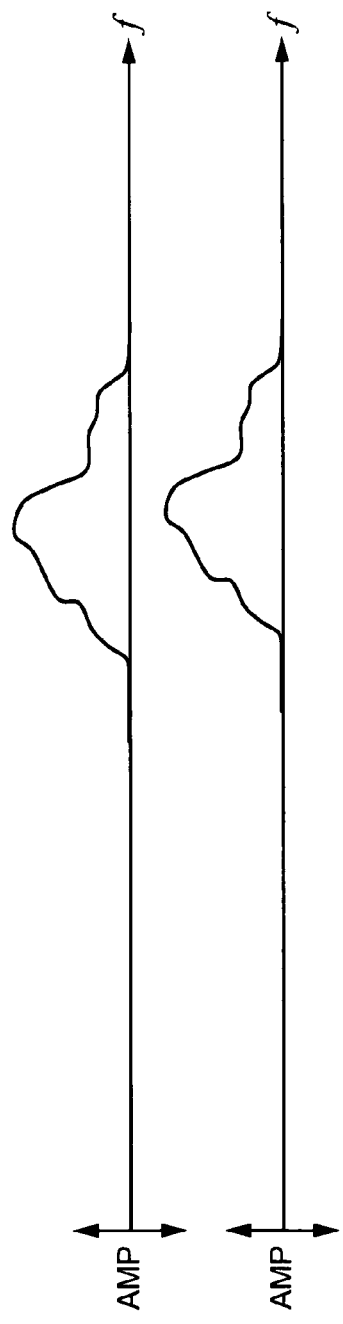
Fig. 2(a)
Fig. 2(b)

US 7,948,633 B2

COMPENSATING FOR TIME VARYING PHASE CHANGES IN INTERFEROMETRIC MEASUREMENTS

This application is a divisional application of U.S. application Ser. No. 11/792,082, Jun. 2, 2008 which is the U.S. national phase of international application PCT/US2005/045002 filed 13 Dec. 2005, which designated the U.S. and claims priority from U.S. Provisional Patent Application No. 60/635,440, filed on Dec. 14, 2004 and from U.S. Provisional Patent Application No. 60/659,866, filed on Mar. 10, 2005, the entire contents of each of which are incorporated by reference.

RELATED PATENT APPLICATION

This application is related to commonly-assigned U.S. patent application Ser. No. 11/062,740, filed on Feb. 23, 2005, the contents of which are incorporated by reference.

TECHNICAL FIELD

The technical field relates to measurement equipment and techniques, and more particularly, to improving the accuracy, precision, and application of interferometric measurements. One non-limiting example application is Optical Frequency Domain Reflectometry (OFDR).

BACKGROUND AND SUMMARY

Mixing between a reference signal and a data signal is often necessary to extract information about an optical device or network. A probe signal and a reference signal originating from the same source typically mix or interfere, resulting in optical interference "fringes." A positive fringe occurs when the light is in phase and constructively combines (interferes) to a greater intensity, and a negative fringe occurs when the light is 180 degrees out of phase and destructively combines (interferes) to cancel out the light. The fringe intensities can be detected and used to assess information about the device being probed. In interferometric sensing, a reference signal is mixed with a reflected probe signal whose phase and/or amplitude is modified by a parameter to be measured. The mixing produces an interference signal, and the amplitude of the interference signal depends on how efficiently the two optical signals mix.

Optical Frequency Domain Reflectometry (OFDR) may be used to provide data related to one or more optical characteristics (e.g., backscatter, dispersion, etc.) of a fiber or fiber optic device that is part of a fiber over relatively short fiber distances, e.g., less than several hundred meters, but with relatively high "spatial" resolutions, e.g., centimeters and less. High spatial resolution is valuable for many reasons. For example, it allows more precise location and/or determination of optical characteristic of "events" like fiber flaws, cracks, strains, temperature changes, etc. and devices like couplers, splitters, etc. High resolution also allows performing such operations with a level of precision that distinguishes between events or devices located close together. Without that high resolution, measurements for closely located events or devices cannot be made on an individual event or device level. For these and other reasons, it would be very desirable to apply OFDR to longer fibers in order to attain this high resolution along longer distances.

Unfortunately, there are two major unsolved obstacles to successfully applying OFDR to longer fibers. One is dynamic phase changes caused by time varying changes in the length of the fiber under test. One source of those time-varying changes is vibration. As a fiber vibrates, its length changes causing different time delays in the reflected light traversing those different fiber lengths. For OFDR to work well, the phase of the reflected light along the fiber should be static and not vary with time. If the time variance of the phase occurs slowly relative to the speed with which the interference pattern intensity data is acquired, then the phase changes are not a problem. But if the speed with which the interference pattern intensity data is detected/acquired is slower than the speed at which the phase changes, then the phase changes cannot be ignored.

The speed at which OFDR interference pattern intensity data is acquired is a function of how fast the tunable laser in the OFDR is "swept" over the frequency range of interest and the fiber length. There is a limit on how fast tunable lasers can be swept in terms of bandwidth, amplifier costs, increased power requirements, and processing speed. Regardless of laser sweep speeds, longer fibers require more time to acquire the measurement data, and there is much more of that data. That large amount of data is the second obstacle because there are practical constraints on how much data can be efficiently and cost effectively stored and processed.

To avoid these obstacles, the inventors discovered how to compensate for the time-varying phase caused by vibrations and any other cause so that laser sweep speed and data set size need not be increased. An optical device under test (DUT) is interferometrically measured. The DUT can include one or more of an optical fiber, an optical component, or an optical system. The DUT can be coupled to the measurement system (e.g., an OFDR) via optical fiber, via some other medium, or even via free space. First interference pattern data for the DUT is obtained for a first path to the DUT, and second interference pattern data is obtained for a second somewhat longer path to the DUT. Because of that longer length, the second interference pattern data is delayed in time from the first interference pattern data. A time varying component of the DUT interference pattern data is then identified from the first and second interference pattern data. The identified time varying component is used to modify the first or the second interference pattern data. One or more optical characteristics of the DUT is determined based on the modified interference pattern data. For example, if the DUT includes a fiber having a length greater than 500 meters, the modified interference pattern data may be used to determine one or more optical characteristics at any position along the fiber. Indeed, that position along the fiber may be determined with a resolution, for example, of one or two centimeters based on the modified interference pattern data.

The first and second interference pattern data each include static phase information and dynamic phase information. The time varying component includes the dynamic phase information. The first and second fringe interference pattern data is combined to substantially remove the static phase information. For example, the first or the second interference pattern data can be combined to remove the vibration-induced phase changes that adversely affect the interference pattern data obtained for the DUT.

A preferred, non-limiting, example is implemented as an Optical Frequency Domain Reflectometer (OFDR) to obtain the first interference pattern data and the second interference pattern data. Preferably, the first and second interference pattern data is compensated for non-linearity associated with a tunable laser used in the OFDR to obtain compensated first and second interference pattern data (compensated for the affect on the data due to non-linearities in the laser tuning). One example processing approach that can be used by the OFDR includes the following steps: transforming the first and second interference pattern data into the frequency domain, capturing a first window of frequency domain data for the first interference pattern data corresponding to a portion of the DUT under analysis, capturing a second window of frequency domain data for the second interference pattern data corresponding to the portion of the DUT under analysis, converting the first and second windows of frequency domain data into first and second corresponding phase data, and combining the first and second corresponding phase data.

Other aspects of this technology includes advantageous methods for processing interference pattern data generated by an interferometer. The interferometer provides a laser signal from a tunable laser along a given optical path having an associated path delay and to a reference optical path and combines light reflected from the given optical path and from the reference path, thereby generating the interference pattern data. (The given optical path may be, for example, associated with a device under test (DUT)). A first laser optical phase of the laser signal is estimated, and an expected complex response for the given optical path is calculated based on the estimated laser optical phase. The interference pattern data from the interferometer is multiplied by the expected complex response to generate a product. The product is filtered to extract interference pattern data associated with the given optical path from the interference pattern data generated by the interferometer.

In one non-limiting example implementation, calculating the expected complex response for the given optical path based on the estimated laser optical phase includes estimating a delayed version of the laser optical phase of the laser signal, determining a difference phase between the delayed version of the estimated laser optical phase and the estimated first laser optical phase, calculating the cosine of the difference phase to form the real part of the expected complex response, and calculating the sine of the difference phase to form the imaginary part of the expected complex response. This expected complex response is then multiplied by the interference pattern data. The real and imaginary parts of the resulting complex signals are low pass filtered and decimated to extract interference pattern data associated with the given optical path from the interference pattern data generated by the interferometer. Estimating the laser optical phase includes coupling a portion of the laser light to a second interferometer, converting an interference fringe or pattern signal from the second interferometer into a digital signal corresponding to the interference pattern data, the digital signal being a sampled form of the interference fringe signal, and estimating the laser phase based upon the digital signal.

A first derivative of the laser optical phase may be estimated based on the digital signal by Fourier transforming the digital signal, windowing the transformed signal to identify a portion of the transformed signal that corresponds to the given optical path delay, inverse Fourier transforming the windowed signal, and computing the phase of the signal. Equivalently, a second derivative of the laser optical phase may be estimated by identifying zero crossings of the digital signal and counting a number of samples between the zero crossings of the digital signal. Calculating an expected complex response for the given optical path based on the estimated laser optical phase may be accomplished by estimating a second derivative of the laser optical phase, calculating a running sum of the second derivative of the laser optical phase, where a length of the running sum is associated with a length of the given optical path delay, accumulating the running sum, calculating a sine of the accumulated sum to form the imaginary part of the expected complex response, and calculating a cosine of the accumulated sum to form the real part of the expected complex response. The real and imaginary parts of the expected complex response are low pass filtered and decimated to extract interference pattern data associated with the given optical path from the interference pattern data generated by the interferometer.

BRIEF DESCRIPTION OF THE DRAWINGS

FIG. 2(a) illustrates interference patterns or fringes from a single reflection where the path is time varying;

FIG. 2(b) illustrates the Fourier transform of pattern and FIG. 2(b);

DETAILED DESCRIPTION

In the following description, for purposes of explanation and non-limitation, specific details are set forth, such as particular nodes, functional entities, techniques, protocols, standards, etc. in order to provide an understanding of the described technology. It will be apparent to one skilled in the art that other embodiments may be practiced apart from the specific details disclosed below. In other instances, detailed descriptions of well-known methods, devices, techniques, etc. are omitted so as not to obscure the description with unnecessary detail. Individual function blocks are shown in the figures. Those skilled in the art will appreciate that the functions of those blocks may be implemented using individual hardware circuits, using software programs and data in conjunction with a suitably programmed microprocessor or general purpose computer, using applications specific integrated circuitry (ASIC), field programmable gate arrays, one or more digital signal processors (DSPs), etc.

Figure 1:
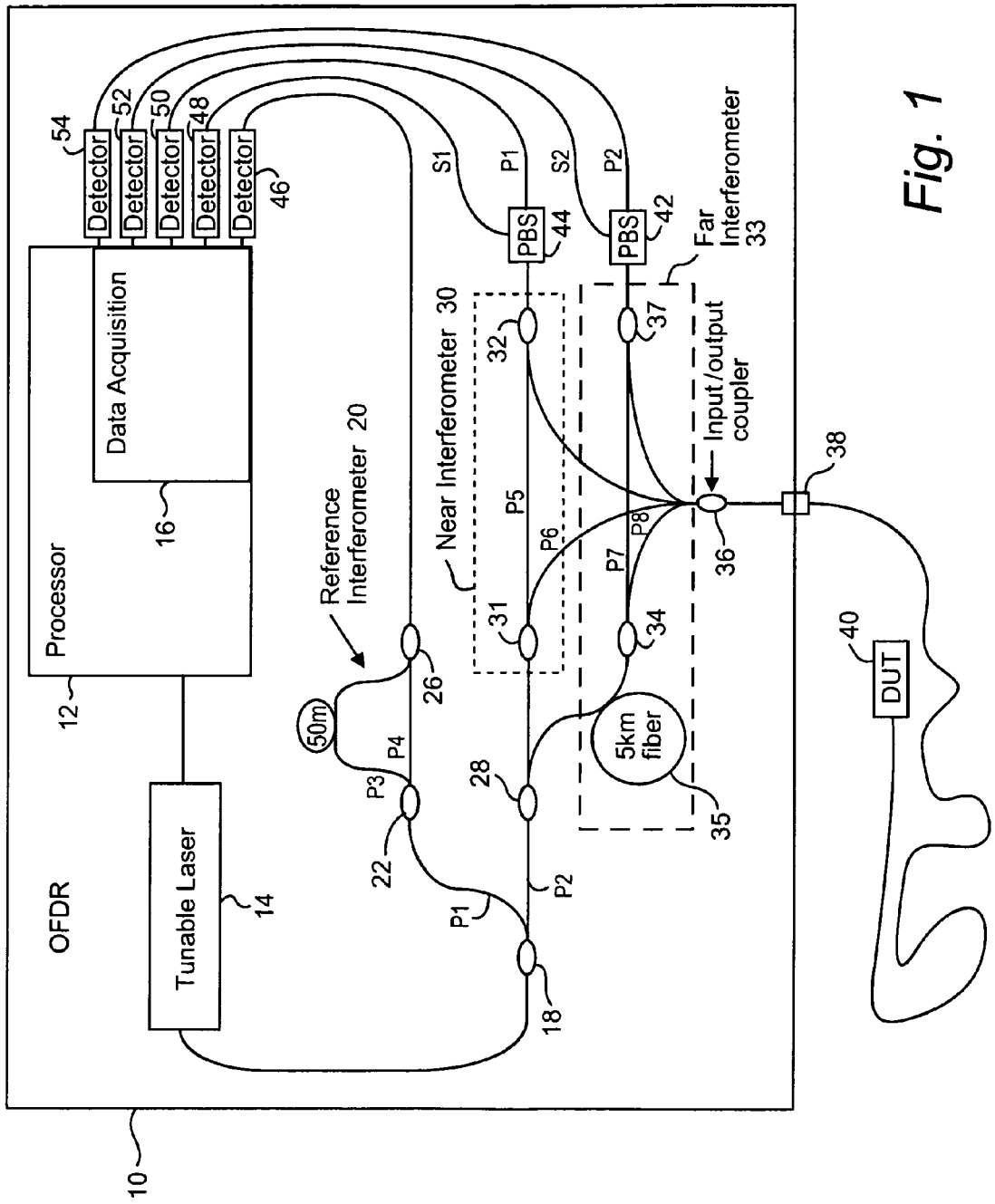
FIG. 1 illustrates a non-limiting example of an OFDR type measurement system that compensates for time varying phase changes in interferometric measurements.

FIG. 1 shows a first, non-limiting, example embodiment implemented in an OFDR 10. The invention is not limited to an OFDR, but may be applied in any fashion, implementation, or environment to compensate for time varying phase changes in interference measurements. The OFDR includes a processor 12 for controlling a tunable laser 14 and a data acquisition unit 16. The processor 12 sweeps the tunable laser continuously over the wavelength range of interest with a limited number of mode-hops. The light from the tunable laser 14 is directed into an optical network associated with the OFDR 10. An input optical coupler 28 splits the laser light into two paths P1 and P2. The top path P1 is directed to a reference interferometer 20.

The reference interferometer 20 is shown as a Mach-Zehnder interferometer, but could be any form of interferometer, such as a Fabry-Perot or Michelson interferometer. The reference interferometer should have two stable arms with minimal dispersion. Optical fiber works well in this application. The reference interferometer 20 includes an optical coupler 22 for splitting the light between two paths P3 and P4. P4 is the shorter path and is coupled to an optical coupler 26. The longer path P3 delays the light before it reaches the same optical coupler 26. The combined light is then provided to a detector 46 which detects the intensity of the light and provides it to the data acquisition unit 16 for processing. The delay difference between the two paths P3 and P4 of the reference interferometer 20 should be long enough that the fine-structure of the laser tuning speed variation is captured. Since most of the tuning speed structure in a laser is due to acousto-mechanical effects below 10 kHz in frequency, the length of the reference interferometer should be chosen such that in normal operation of the OFDR, the frequency of the interference fringes or patterns produced by the reference interferometer is substantially greater than 10 kHz. One example frequency is 40 kHz. The reference interferometer light from the detector 46 is digitized by the data acquisition unit 16 and then used to resample the interferometeric data from near and far interferometers 30 and 33 (described below) using as one example the technique described in U.S. Pat. No. 5,798,521, the contents of which are incorporated herein by reference. This resampling operation takes data sampled in equal increments of time, and changes it to data that is in equal increments of wavelength. In other words, the sampled near and far interferometric measurement data is now linear in wavelength.

The light in path P2 is split again in coupler 28 and directed to near and far interferometers 30 and 33, respectively. The near interferometer 30 includes an optical coupler 31 that splits the input light into two paths including a shorter path P5, which is coupled directly to an output optical coupler 32, and a longer path P6, which is coupled to an input/output coupler 36. The far interferometer 33 includes a longer path, (that extra length is shown as an example 5 km fiber loop 35), that delays when the light reaches optical coupler 34. Coupler 34 splits that delayed light into a shorter path P7 and a longer path P8. The shorter path P7 is coupled directly to the coupler 37, and the longer path P8 is coupled to the input/output coupler 36. The input/output coupler 36 combines the light from the longer path P6 in the near interferometer 30, and the longer path P8 in the far interferometer 33. The coupler 36 output connects to a connector 38 to which a device under test (DUT) 40 is coupled by a fiber as shown.

Reflected light from the (DUT) 40 is coupled by the input/output coupler 36 and is distributed to the two longer paths P6 and P8 where it is combined in (interferes with) respective couplers 32 and 37 with light from their respective reference paths P5 and P7. The interference output from coupler 32 is provided to a polarization beam splitter (PBS) 44 which provides two orthogonal polarized components of the light S1 and P1 to separate S and P light intensity detectors 48 and 50. The output from the far interferometer 33 is similarly provided to its own polarization beam splitter 42, and the intensity of the orthogonal light polarizations S2 and P2 are provided to respective detectors 52 and 54. The data acquisition unit 16 digitizes the detected light at each detector and provides the digital information (interferometric pattern measurement data) for processing.

The 5 km of fiber 35 in the far interferometer 33 gives a delay of about 25 microseconds. As a result, the measurements made by the far interferometer 33 occur 25 microseconds after the measurements made by the near interferometer 30. The two time-offset groups of interferometric measurement data provide a quantitative measurement of the time-varying nature of the DUT 40. If the frequency of the time variations affecting the DUT is much smaller than the frequency of the time delay for the far interferometer 33, (e.g., 25 microseconds corresponds to 40 kHz, and typical vibration frequencies are below 1 kHz), then the phase difference between the two measurements will be proportional to the derivative of the phase difference as a function of time. The actual phase variation can then be obtained by integrating the phase difference between the two measurements.

FIG. 2(a) illustrates near and far interferometric patterns or "interferograms." Distortion of the phase appears as compressed and extended periods of the sine wave. This can be seen easily by comparing the zero crossings for both waveforms. When the interferograms are transformed into the frequency domain using a Fourier transform, errors due to the time-varying changes cause the expected sharp frequency peaks to spread out and to be misshapen as shown in FIG. 2(b).

Figure 3A:
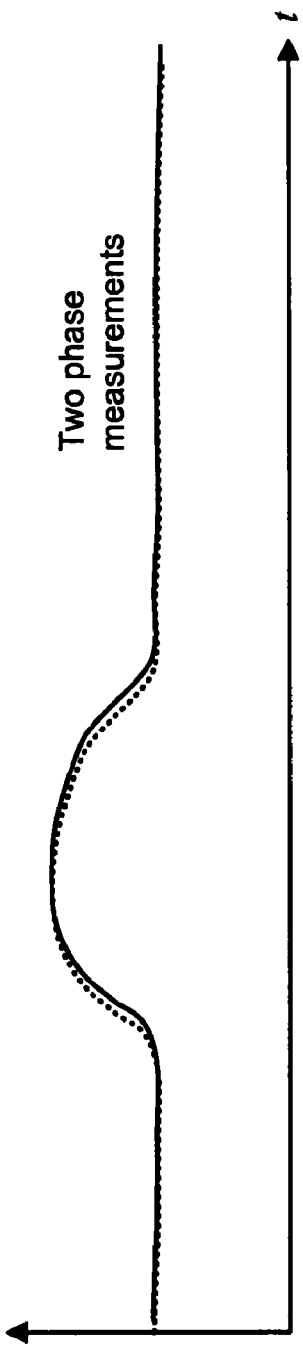
FIG. 3 illustrates three graphs that plot the phase of the two signals shown in FIG. 2(a) as a function of time, then the phase difference between the two phase measurements, and then the integral of the phase difference.
Figure 3B:
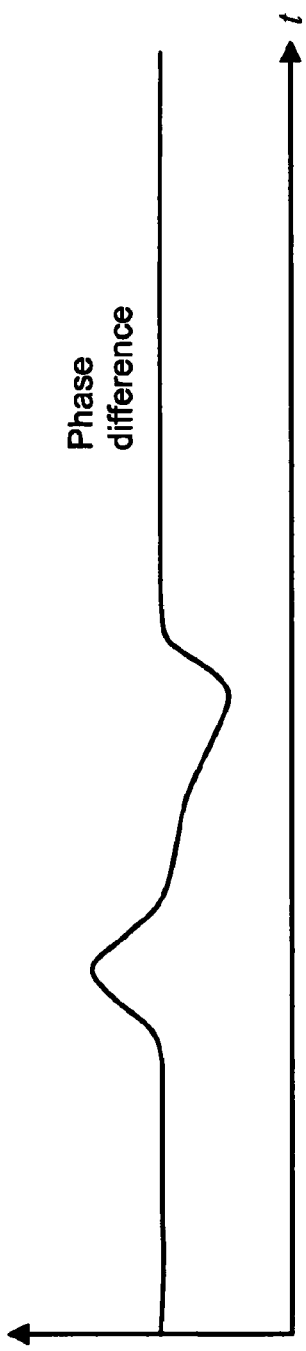
Figure 3C:
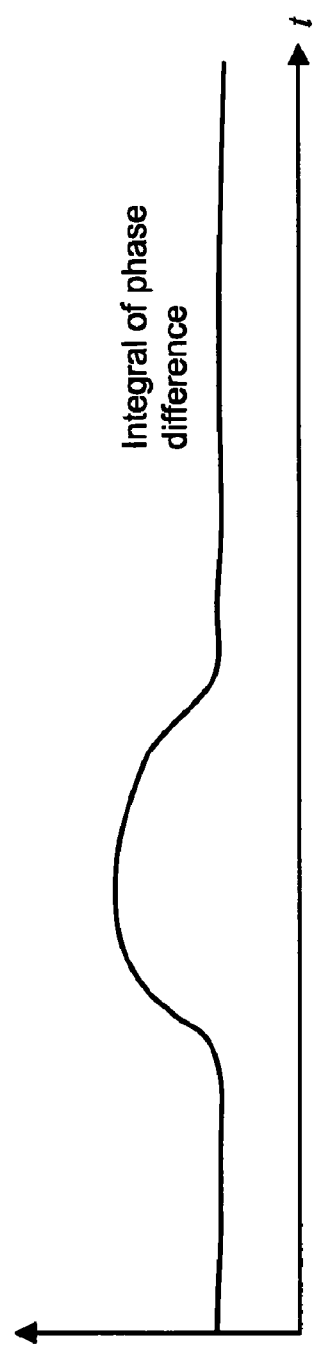

Applying an inverse Fourier transform to the points in the waveform segment associated with each widened frequency peak shown in FIG. 2(b) into the time domain provides a measure of the phase of each signal. An illustration of the phases of both interferometer signals is shown in FIG. 3(a), where one of the signal phases is shown as a dotted line. One signal is delayed with respect to the other. If the phase features are fixed characteristics of the DUT, then they will should occur at the same wavelength for each OFDR laser sweep, and therefore, no such delay should be present. So the time varying part of the phase signal corresponds to any delay. Consequently, when the phases of each signal are subtracted, as shown in FIG. 3(b), the static parts of the DUT's phase variation cancel, and only the dynamic, time varying phase component remains. The remaining phase difference can then be integrated, (taking into account the proportion as shown in equation (5) below), introduced by the sampling interval, as shown in FIG. 3(c), and the original time-variant phase reconstructed. This integration may be done using a numeric integral, of which there are a number of methods, any one of which could be employed here. The reconstructed phase can then be subtracted from the phase of the original "near" interferometric pattern data to produce a phase measurement free of the effects of vibration (or any other time varying influences) in the interferometer.

What was just explained graphically and textually is now demonstrated mathematically beginning with an equation for the phase of signal:

$$\phi(t) = \theta(\omega(t)) + \beta(t) \quad (1)$$

where, $\phi$, is the phase of the measured signal, $\theta$ is the phase of the signal that is dependent upon the frequency, $\omega$, of the incident light, and $\beta$ is the time-variant phase of the path leading to the DUT. The frequency, $\omega$, and the time-variant phase, $\beta$, are both shown as function of time, t. In a standard OFDR system, only one measurement of $\phi$ as a function of time is available, and so the frequency and time dependent components of phase, $\theta$ and $\beta$, cannot be separated. Introducing a slightly delayed version of the laser sweep, produces a second phase measurement, where $\Delta$ is the delay:

$$\phi'(t) = \theta(\omega(t-\Delta)) + \beta(t) \quad (2)$$

This second measurement can then be numerically delayed so that the laser frequencies of the two functions $\phi$, $\phi'$ are identical. This is a accomplished by a numerical shift in the data that is equivalent to the delay $\Delta$ introduced by the fiber delay line.

$$\phi'(t+\Delta) = \theta(\omega(t)) + \beta(t+\Delta) \quad (3)$$

Subtracting the two phase measurements results in:

$$\phi'(t+\Delta) - \phi(t) = \beta(t+\Delta) - \beta(t). \quad (4)$$

Division by the delay, $\Delta$, gives an expression:

$$\frac{\phi'(t+\Delta) - \phi(t)}{\Delta} = \frac{\beta(t+\Delta) - \beta(t)}{\Delta} \approx \frac{d\beta}{dt}. \quad (5)$$

Obtaining useful results often requires a more precise calculation of the phase error from the difference in the two signals, which can be done using Fourier transforms. Starting with the expression in equation (4) of the measured signal, $$\theta(t) = \beta(t+\Delta) - \beta(t) \quad (6)$$

where $\theta(t)$ is the signal that can actually be measured, and $\beta(t)$ is the signal to be determined. Fourier transforming the equation results in:

$$\int_{-\infty}^{\infty} \vartheta(t) e^{i\omega t} dt = \int_{-\infty}^{\infty} \beta(t+\Delta) e^{i\omega t} dt - \int_{-\infty}^{\infty} \beta(t) e^{i\omega t} dt \quad (7)$$

doing a change of variables results in:

$$\int_{-\infty}^{\infty} \vartheta(t) e^{i\omega t} dt = \int_{-\infty}^{\infty} \beta(t) e^{i\omega(t-\Delta)} dt - \int_{-\infty}^{\infty} \beta(t) e^{i\omega t} dt \quad (8)$$

and pulling $\Delta$ out of the integral over t results in:

$$\int_{-\infty}^{\infty} \vartheta(t) e^{i\omega t} dt = e^{-i\omega\Delta} \int_{-\infty}^{\infty} \beta(t) e^{i\omega t} dt - \int_{-\infty}^{\infty} \beta(t) e^{i\omega t} dt \quad (9)$$

$$= (e^{-i\omega\Delta} - 1) \int_{-\infty}^{\infty} \beta(t) e^{i\omega t} dt$$

For $\Delta=0$, i.e. no time delay, there is no signal available, and the time-varying phase cannot be measured. If $\Delta\omega$ is very small, the measure of the time-varying phase is poor. Accordingly, slowly varying phases will not be well accounted for. Fortunately, as explained above, slowly varying effects do not disturb the measurements significantly, and generally can be ignored. As $\Delta\omega$ approaches $2\pi$, the signal goes to zero because the delay is now equal to the period of the signal. For a 25 microsecond delay, this effect occurs at 40 kHz. But such high frequencies are uncommon in optical fiber lengths. Dividing through by the term in front of the $\beta$ integral and inverting the transform to find $\beta$ results in:

$$\frac{1}{2\pi} \int_{-\infty}^{\infty} \left[ \frac{\int_{-\infty}^{\infty} \vartheta(t) e^{i\omega t} dt}{(e^{-i\omega\Delta} - 1)} e^{-i\omega\tau} \right] d\omega = \beta(\tau) \quad (10)$$

From the math above, the following process can be extracted. Measure the interference pattern data for both the delayed (far) signal and the un-delayed (near) signal. This signal is acquired as a function of laser wavelength, and is therefore considered to be in the frequency domain. Next, both signals are transformed into a time domain, and the time segment that contains the DUT segment of interest is selected. The segment of DUT data is then converted back into the frequency domain. From the segment of DUT data, the phases of the far and the near signal are determined, and the phase difference between those phases is calculated. The phase difference is Fourier transformed into the frequency domain and divided by the expression in the denominator of equation (10). The inverse transform is performed on the result to obtain the time-varying phase component β(t).

Figure 4:
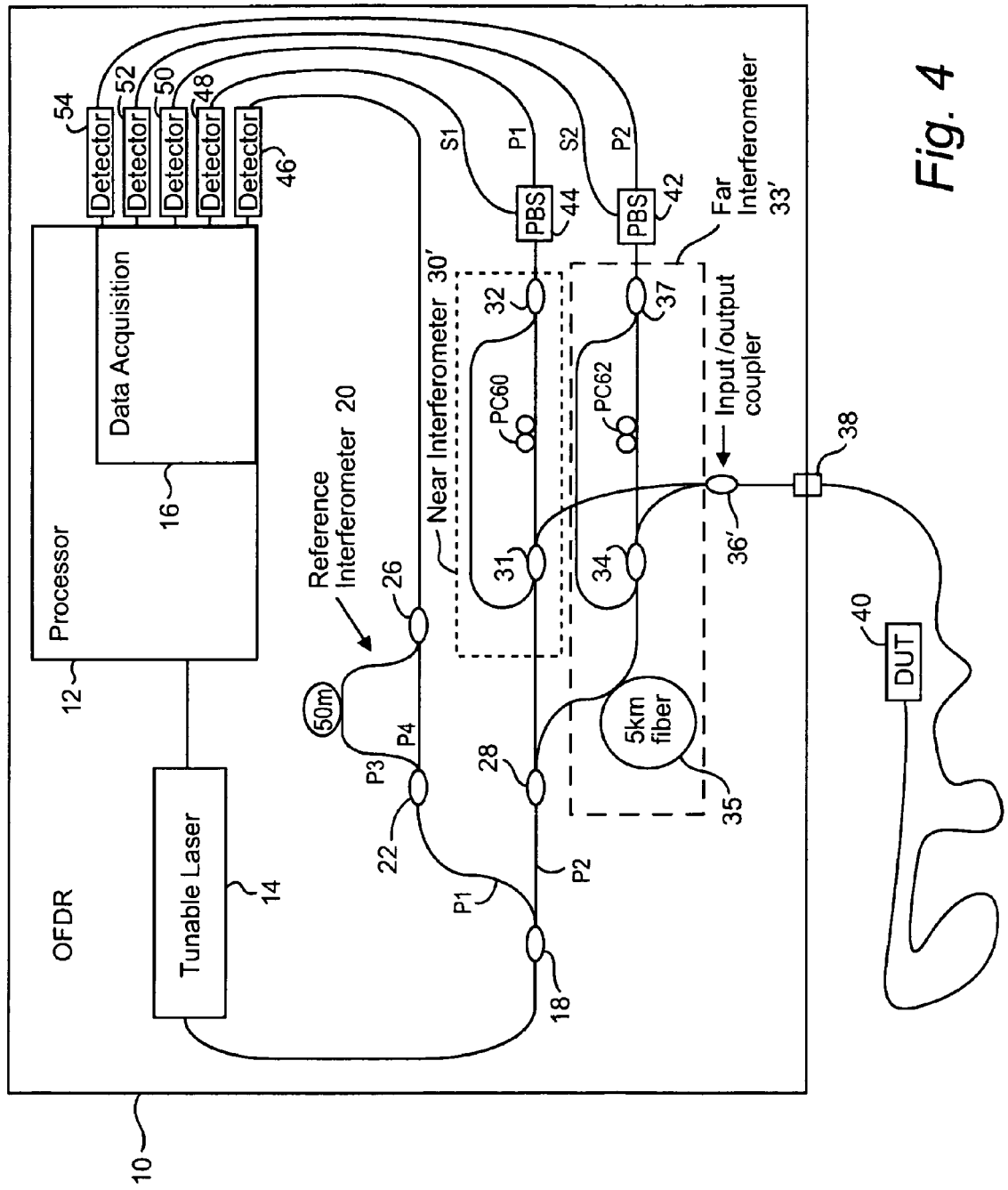
FIG. 4 illustrates a second non-limiting example of an OFDR embodiment.

Although the above procedures may be implemented using the example configuration shown in FIG. 1, an alternate, second, example, non-limiting embodiment using a different coupler arrangement as shown in FIG. 4 may be employed. (Like reference numerals refer to like elements throughout the drawings.) The configuration of the near interferometer 30' and the far interferometer 35' is somewhat different. Light from coupler 28 is provided to optical coupler 31, and the light output from coupler 31 is split between a polarization controller (PC) 60, which aligns the light to be evenly split between the polarization modes of the Polarization Beam Splitter (PBS) 44 (e.g., s and p polarizations), and which provides polarized light to the optical coupler 32 and another path that couples directly to the a 1×2 input/output coupler 36'. Light reflected from the DUT 40 returns through coupler 36 to coupler 31. A portion of the reflected DUT light is directed to coupler 32 where it is summed with the light that passed through the polarization controller (PC) 60. The far interferometer 35' includes a similar configuration with an input optical coupler 34, a polarization controller 61, and output optical coupler 37. The second path output from the optical coupler 34 is coupled to the input/output coupler 36'. This embodiment has an advantage relative to the first embodiment in that the couplers are less expensive and more readily available 2×2 or 1×2 couplers. The 1×4 input/output coupler 36 used in the first embodiment is not required. Moreover, the overall light intensity loss in the two interferometers 30' and 33' is somewhat lower. But a drawback is that reflections from the polarization beam splitters 44 and 42 and the detectors 46-54 can appear in the measurement data.

Figure 5:
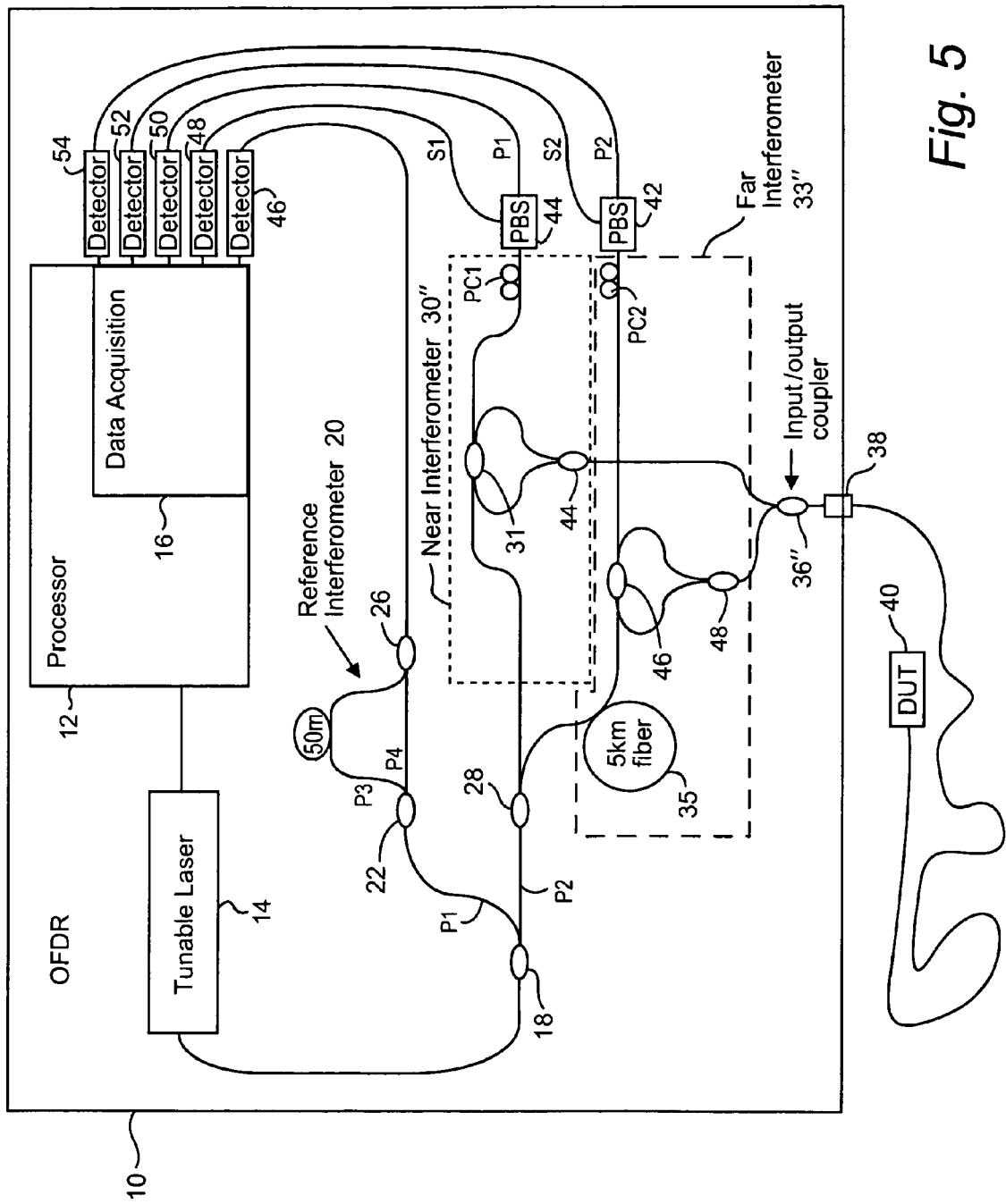
FIG. 5 illustrates a third non-limiting example of an OFDR embodiment.

FIG. 5 illustrates a third, non-limiting, example embodiment of an OFDR that includes a near interferometer 30" and an far interferometer 33". The near interferometer 30" receives light in a 2×2 coupler 42, the output of which is provided to polarization controller PC 1. The second output of the coupler 31 (on the bottom right of coupler 31) is provided to coupler 44, which then provides light to coupler 36". Light reflected from the DUT 40, returns through coupler 36. A portion of that light continues to coupler 44, where half of the light is then directed along the path on the left, connecting couplers 44 and 31. The light is then summed at coupler 31. The far interferometer 33" includes a similar coupler configuration with 2×2 coupler 46 receiving light and outputting one path to a polarization controller PC2. The two output paths are combined in output coupler 46, the output of which is provided to the 1 by 2 input/output coupler 36". An advantage of this embodiment is that reflections from the polarization beam splitters 44 and 42 and the detectors 46-54 do not appear in the interference pattern measurement data. A disadvantage, however, is that strong reflections from the DUT 40 will be re-circulated and multiple images will occur. If a strong reflector is present at the DUT, light can pass from the right hand path connecting coupler 44 to coupler 31, to the left hand path connecting coupler 31 to coupler 44, and then back to the DUT where it will be reflected again.

A problem encountered with using relatively long delay fiber loops such as the 5 km fiber loop 35 shown in FIG. 1 is polarization stability—both as a function of time and wavelength. However, the polarization stability problem may be overcome using a Faraday Rotator Mirror (FRM) in conjunction with a fiber-optic coupled circulator to produce a long delay line with a stable polarization. A Faraday Rotator Mirror compensates for variations in the state of polarization of received light but returns the light in a polarization that is orthogonal to the polarization mode in which it was received.

Figure 6:
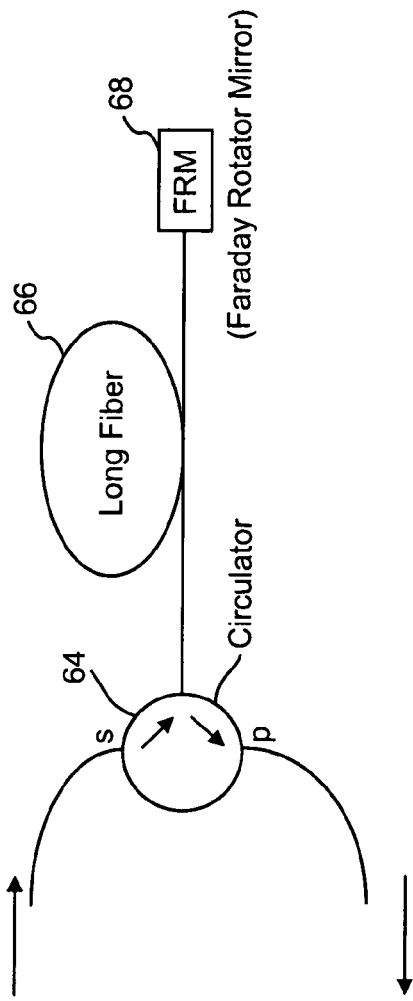
FIG. 6 is a diagram that illustrates one example approach for achieving polarization stability issues for long delay lines.

FIG. 6 shows a circulator 64 which receives light and circulates it to the long fiber delay line 66. The delayed light is reflected by a Faraday Rotator Mirror 68 in a polarization mode orthogonal to the light that entered the input to the circulator 64. The light that exits the circulator 64 is then caused by the Faraday Rotator Mirror to be orthogonal to the light that entered the circulator's input port. Since the long fiber 66 does not affect the polarization state of the light entering the circulator 64, it does not affect the polarization state of the light exiting the circulator 64.

Figure 7:
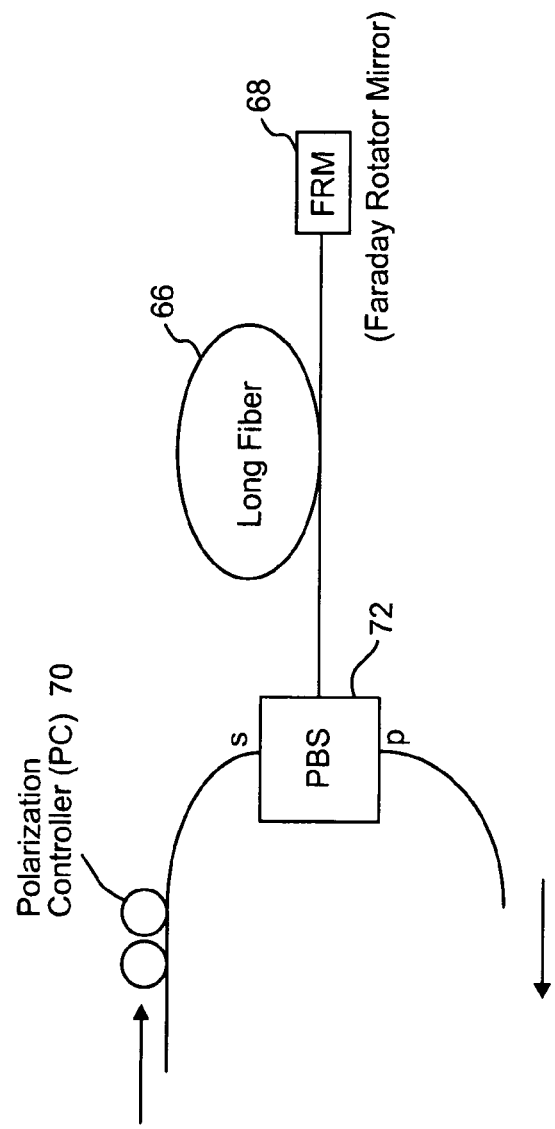
FIG. 7 illustrates one example configuration to provide a more polarization stable delay lines.
Figure 8:
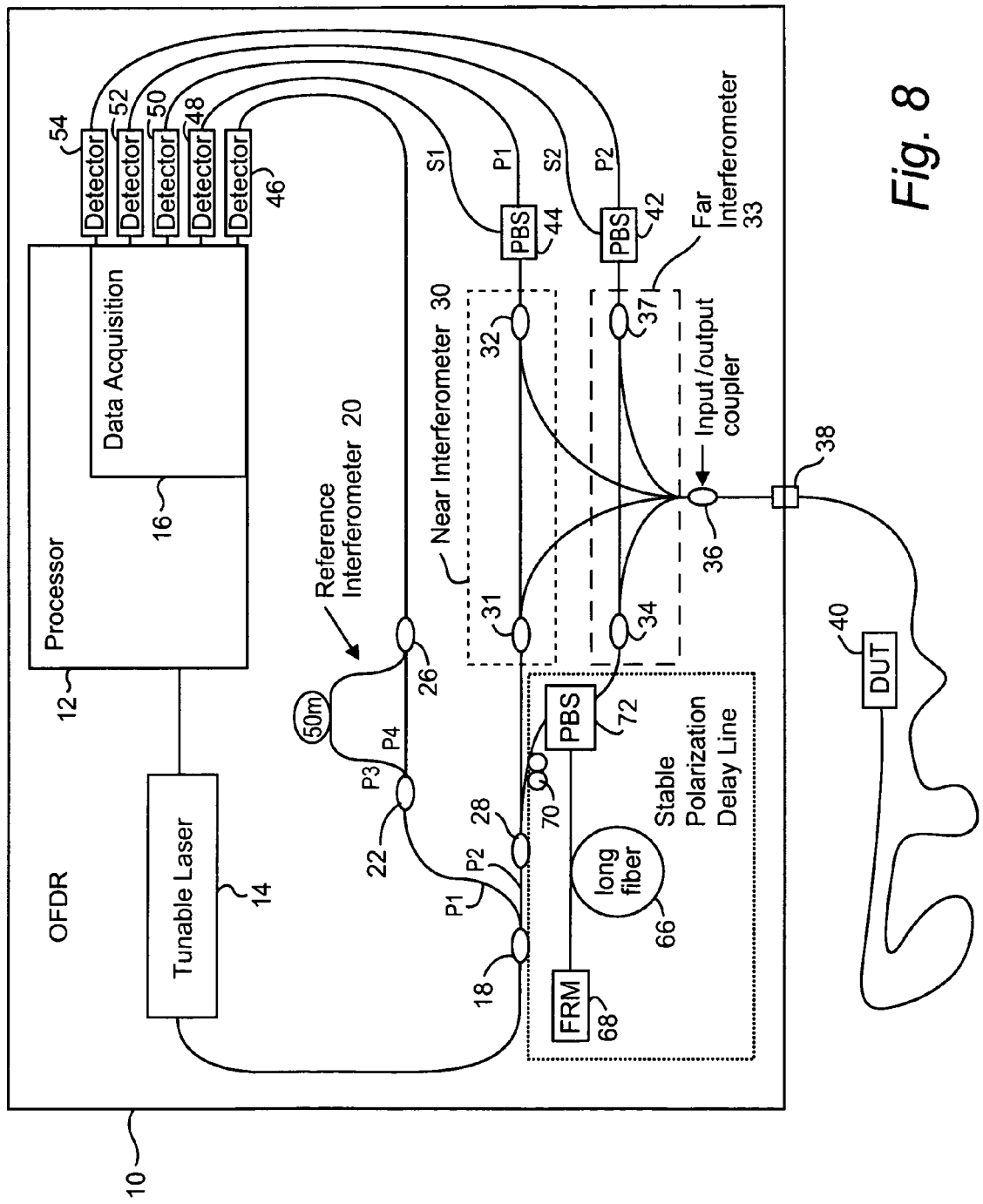
FIG. 8 illustrates a fourth non-limiting example of an OFDR embodiment.

A polarization controller and a polarization beam splitter (PBS) can be used instead of a circulator. FIG. 7 shows incoming light aligned in the "s" polarization mode by a polarization controller 70 before being split by the polarization beam splitter 72. All of the s-polarized light goes through delay 66 and is reflected by the FRM 68. The PBS 72 forwards the reflected light now in the "p" polarization mode. This configuration is less expensive than the configuration shown in FIG. 6. FIG. 8 illustrates an OFDR similar to that shown in FIG. 1 but with the inclusion of the polarization stabilizing elements from FIG. 7, which could also be included in FIGS. 3 and/or 4.

Figure 9:
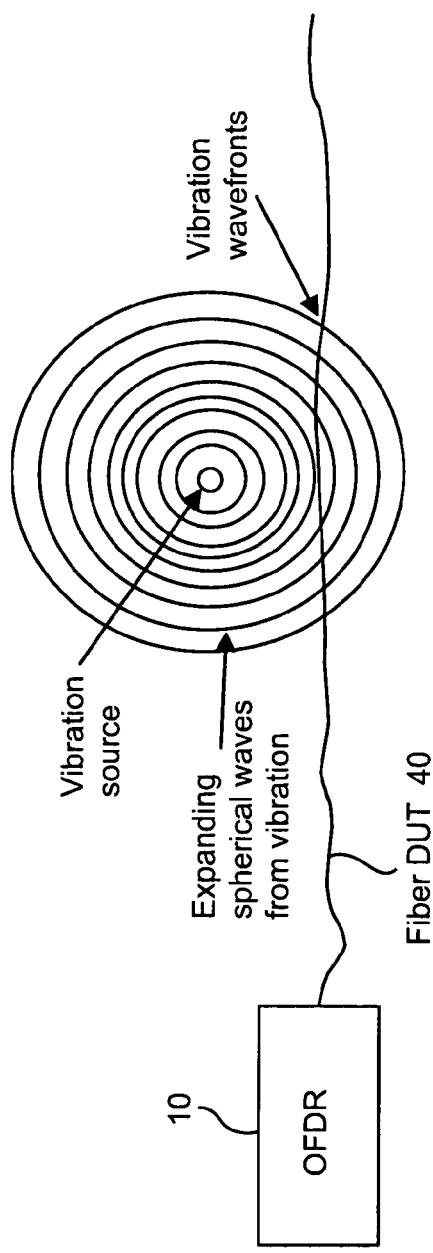
FIG. 9 is a diagram that shows a vibration impacting a fiber DUT.

As mentioned in the background, vibrations can be a problem for interference measurements. For example, FIG. 9 shows an OFDR 10 coupled to a fiber DUT 40. A vibration source generates vibration wave fronts and expanding traveling waves that impact and vibrate the DUT fiber 40. From the pattern of the traveling waves incident on the DUT 40, a location of the vibration source, the distance of the vibration source from the fiber, and a point on the fiber which is closest to the fiber source can be determined. In a similar way, by matching the incident pattern expected for a given location on the fiber, the vibration originating from that location can be filtered out from among many different vibration sources using phased array antenna principles.

Figure 10:
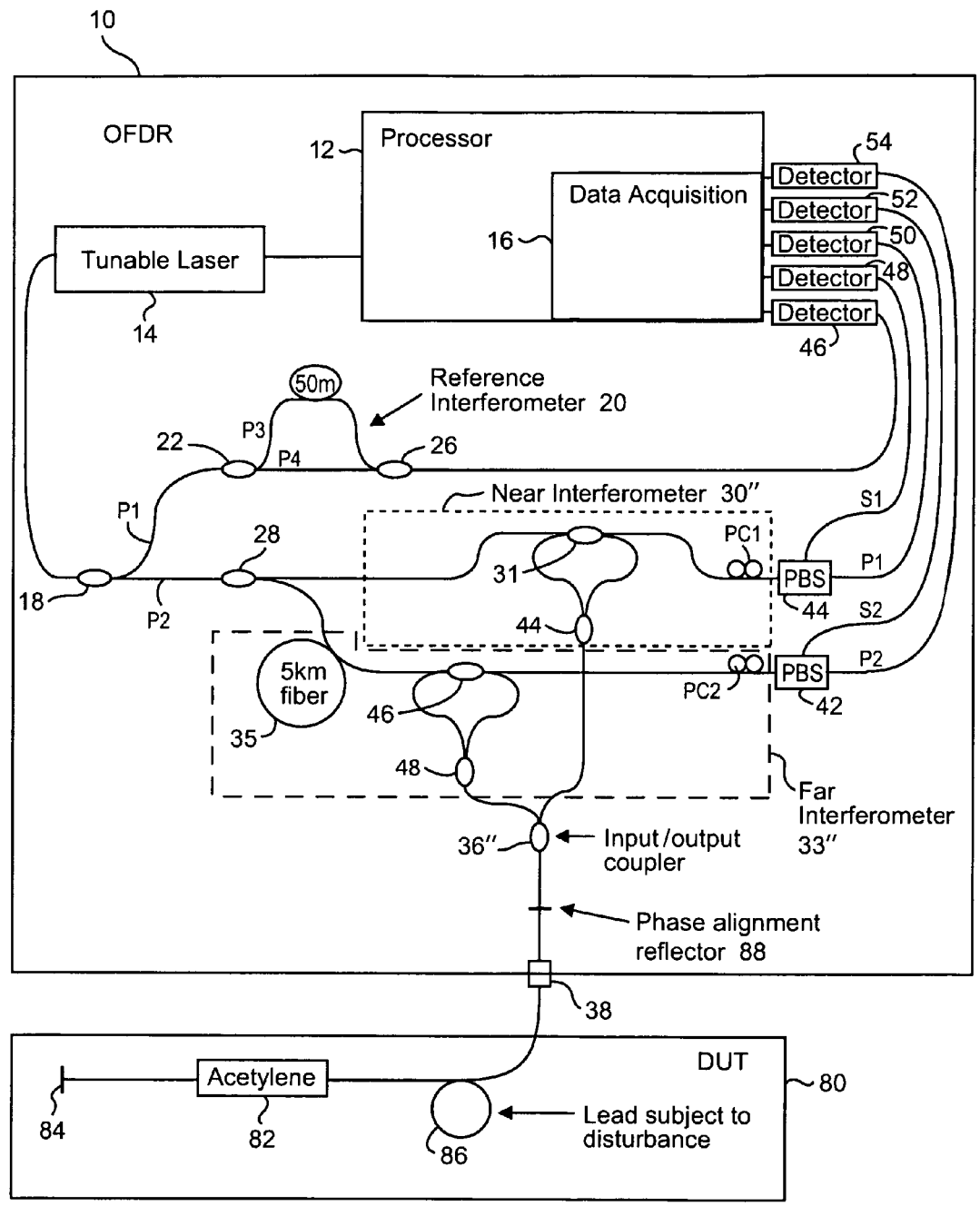
FIG. 10 illustrates a non-limiting experimental OFDR for testing vibration tolerance.
Figure 11:
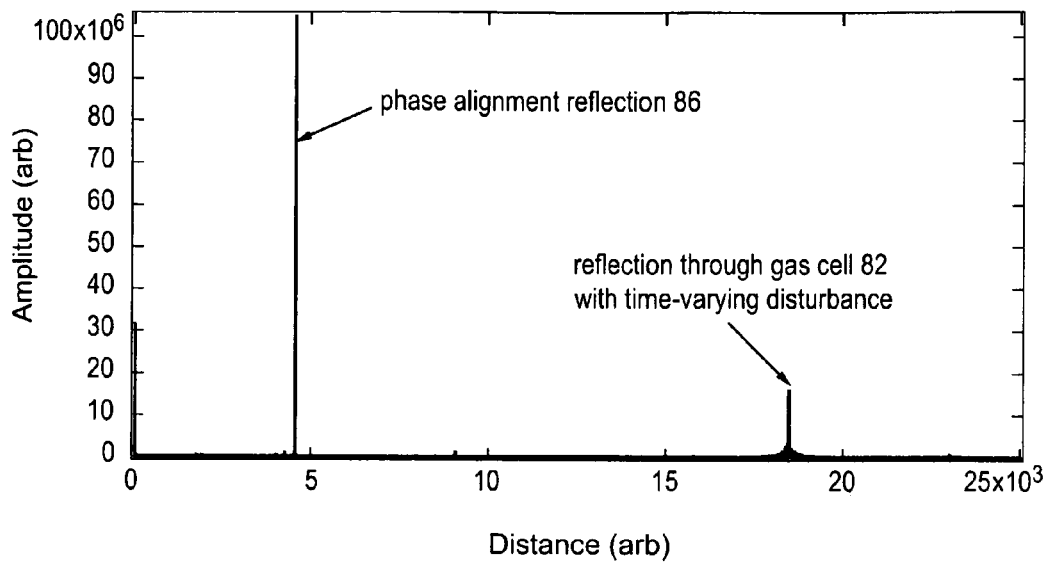
FIG. 11 is a graph illustrating a Fourier transform of frequency linearized interference pattern data.

A non-limiting, example prototype OFDR is shown in FIG. 10. The DUT 80 includes a reflector 84 coupled to an acetylene gas cell 82 that produces a phase artifact in the static part of the interference data. This phase artifact is due to the absorption line of the gas in the cell and was chosen to ensure that the method was indeed removing the dynamic phase effects while retaining the static ones. A small coil 86 coupled the gas cell 82 was subjected to a disturbance (tapping by fingers) during the laser sweep. The laser was swept at about 40 nm per second, and the 50 m delay used in the reference interferometer 20 was used to linearize the detected interference pattern data to the correct corresponding laser wavelength by the data acquisition unit 16. One example way to accomplish that compensation process is described in U.S. Pat. No. 5,798,521. The linearized interference pattern data was then Fourier transformed, and the resulting amplitude v. frequency plot is shown in FIG. 11. Since the near and far interferometers will not have precisely the same differential lengths, a "phase alignment" reflector 88 was used to allow the phases measured by each of the near and far interferometers to be aligned so that the interference pattern data appears as if the two interferometers had precisely the same length.

Figure 12:
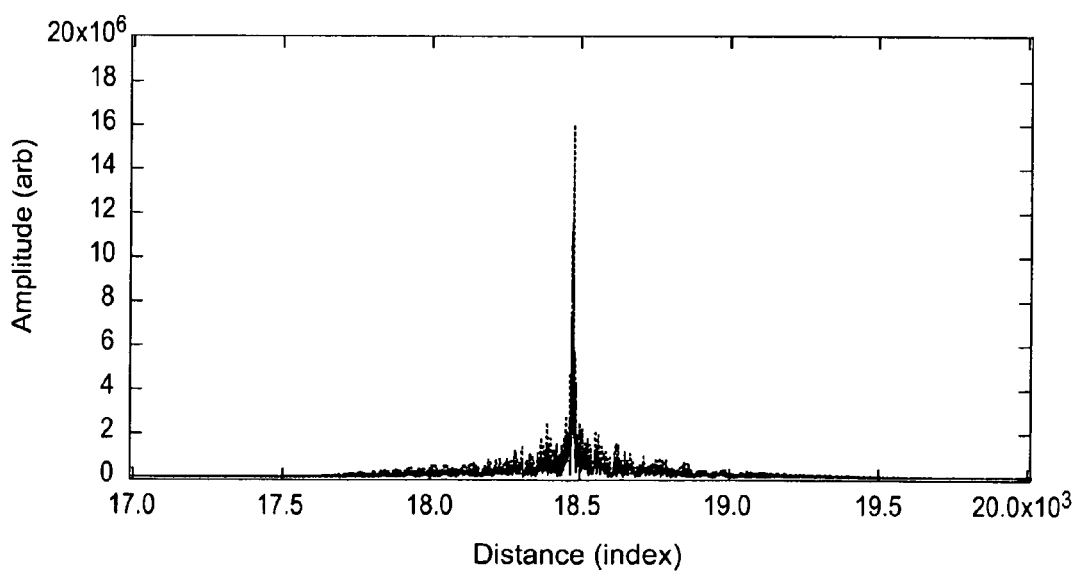
FIG. 12 is a graph of one portion of the graph in FIG. 11.
Figure 13:
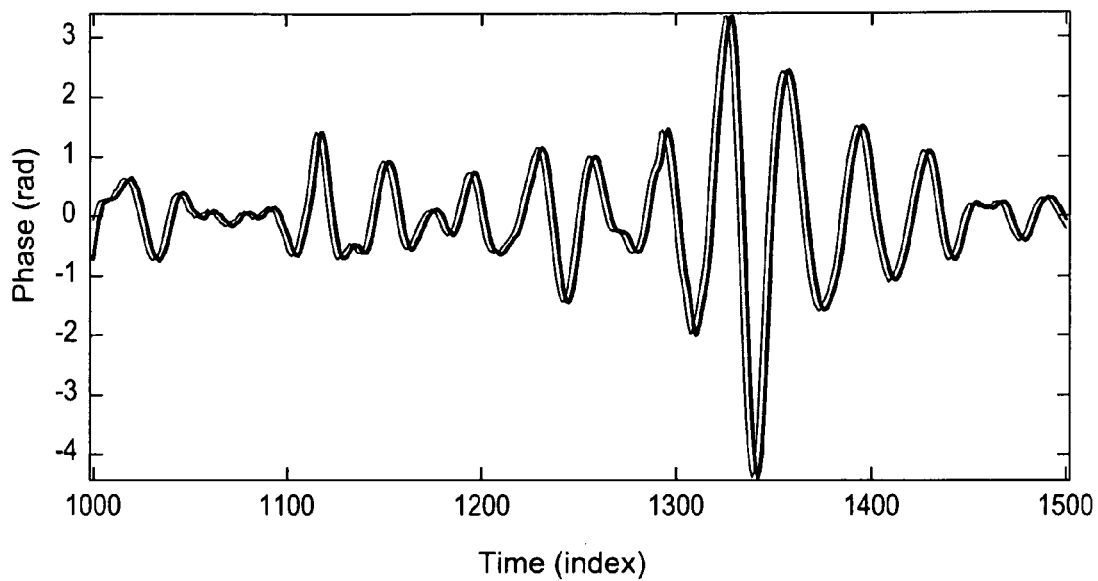
FIG. 13 is a graph that plots phase as measured by near and far interferometers.
Figure 14:
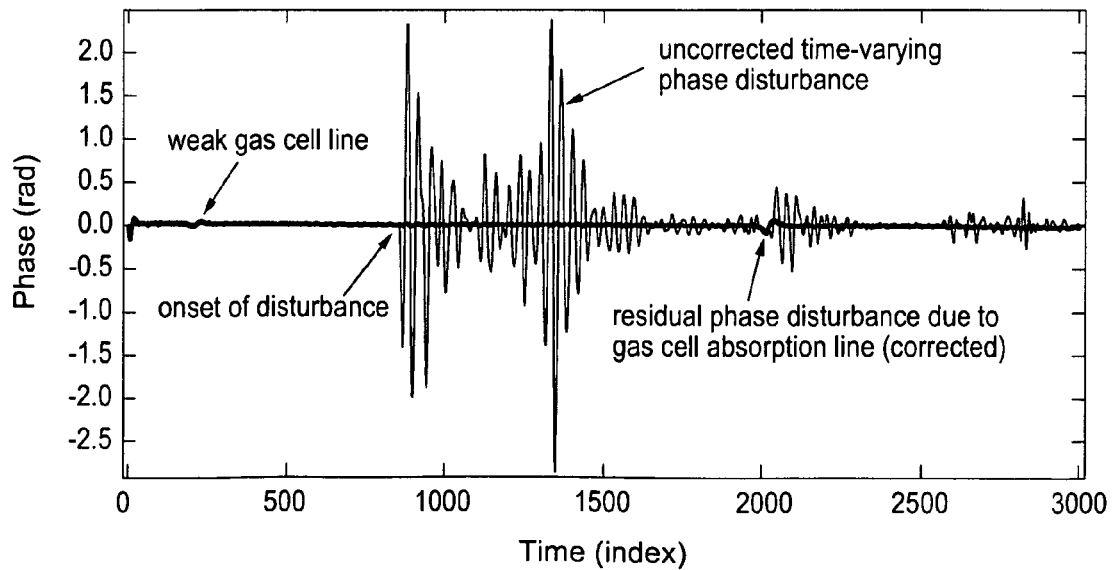
FIG. 14 is a graph illustrating phase data uncorrected for vibration relative to phase corrected phase data.

The effects of the vibration disturbance in the measurement path can be seen in width of the base of the gas cell frequency peak in FIG. 11. FIG. 12 is a closer view of the reflection through the gas cell. The wide spread around the peak base is caused by the time-varying disturbance to the optical fiber. The complex data associated with the fiber segment shown in FIG. 12 can be windowed, inverse Fourier transformed into the time domain, and the phases calculated to produce a phase vs. time plot for each of the near and far interferometers. The small phase delay between the two signals (thin and thick lines) is shown in FIG. 13. The difference between these phases was determined and processed as described in equation (10). Subtracting the calculated time-variant phase from the measured phase from one of the near or far interferometers produces a static or time invariant phase shown as a thick black line in FIG. 14. For comparison, the original phase containing both the time-varying and time-invariant phase components is shown as a thin line.

Using two separate near and far interferometers with separate reference paths as shown in the above example embodiments results in a number of additional problems. First, the necessary splitting of the light into near and far interferometer reference paths and the coupling mechanisms required to get both probe signals from the near and far interferometers into and out of the DUT results in significant signal loss. Second, with two separate interferometers, the two probe signals from the near and far interferometers will be at different polarizations. If the DUT is polarization-dependent, which is likely, the resulting interferometric measurement data will be different for different probe light polarizations. Third, with separate reference paths for the near and far interferometers, the relative phases between the interferometer pattern or fringe data can change as a result of drift caused by temperature induced changes in the relative lengths of the reference paths. Very small changes (<1 C) in temperature can cause several wavelengths of change in the lengths of optical fibers. To overcome these problems, a single reference path may be used if a delay is introduced to the measurement arm of the interferometer. The delayed term now appears as an interference term at the delay distance plus the DUT distance. A single reference path architecture significantly simplifies the OFDR optical network and requires fewer optical components, resulting in lower cost and higher reliability.

Figure 15:
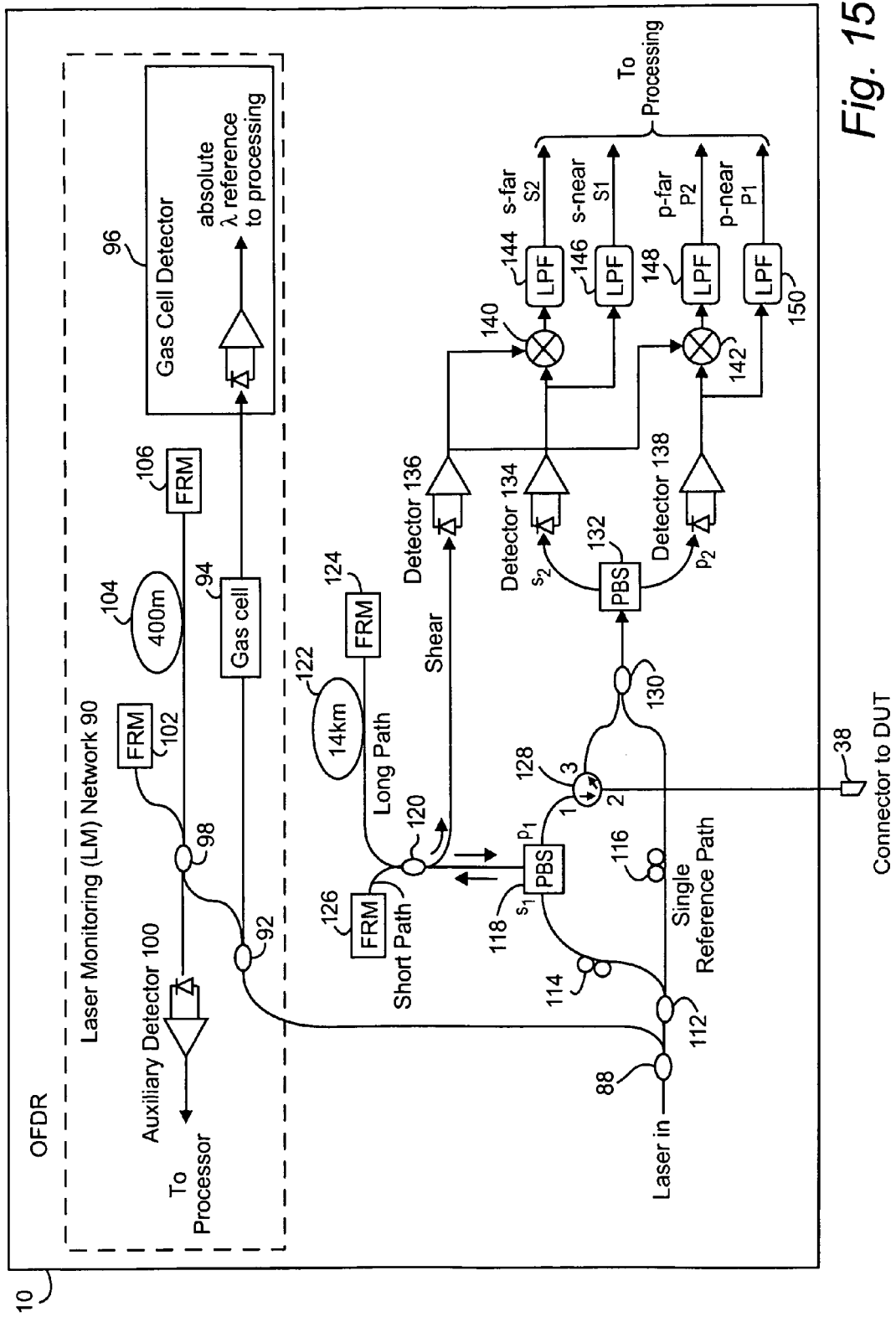
FIG. 15 is a fifth non-limiting example of an OFDR embodiment.

FIG. 15 is an example of an OFDR that employs a single interferometer reference path while still providing near and far interferometric measurement data. The OFDR in FIG. 15 is substantially simpler and more power-efficient than an OFDR employing multiple reference paths. Light from the tunable laser source is introduced into the network at the "laser in" port. A small portion of the light (1% to 10%) is tapped off and connected to a laser monitoring (LM) network 90 that includes a coupler 92 for receiving the input laser light from coupler 88, an interferometer, and an absolute wavelength reference. The absolute reference is typically a gas cell 94 with absorption lines within the tuning range of the laser, but a thermally stable etalon could be substituted with some loss in accuracy. The length of the laser (wavelength) monitoring network 90 is chosen such that it is long enough to provide high temporal resolution measurements of the laser frequency, but short enough to provide a non-zero frequency response to the laser's tuning speed errors. If the maximum frequency content of the laser tuning speed error is given by $f_L$, and the minimum tuning speed (in frequency) of the laser is given by, $v_{min}$, then the wavelength monitor interferometer must be chosen such that, $$\frac{4f_L}{v_{min}} < D < \frac{1}{4f_L},$$

where D is the delay of the interferometer in seconds. Using the speed of light, the group index of the fiber, and the geometry of the interferometer (Mach-Zehnder, Michelson, or Fabry-Perot), the required length of fiber can be readily calculated.

The light from coupler 92 is split between the gas cell 94, which provides an absolute wavelength reference detected by detector 96, and coupler 98 which couples the light to a polarization stabilization network including a FRM 102, a 400 meter delay loop 104, and a FRM 106. Ultimately, the reflected light is combined in coupler 98, detected at auxiliary detector 100, and provided for processing as the LM monitored signal. This LM signal provides a precise measurement of changes in the wavelength of the laser. The gas cell provides absorption lines that provide highly accurate measurements of the absolute laser wavelength. Thus, the LM network 90 provides to the data processor absolute wavelength references and the output laser wavelength as a function of time so that the light intensity interference pattern data can be correlated with the actual input wavelength that caused that data.

The laser input light from coupler 88 is also received in a single reference path near and far interferometer. Coupler 112 splits the light between the single reference path, which includes a polarization controller 116 to align the reference light to the transmitting polarization state of one of the polarizing ports on a polarization beam-splitter (PBS) 132, and the measurement path that includes a polarization controller 114 to align the light to one polarization "$s_1$" before being received at the s-port of a polarization beam splitter (PBS) 118. As a result of the s-polarization at PC 114, nearly all of the input light is output by the PBS 118. The PBS output is divided in coupler 120 between a "short path" (which in the two reference path embodiments above is associated with the near interferometer) that ends in an FRM 126, and a "long path" (which in two reference path embodiments above is associated with the far interferometer) that ends in an FRM 124 after being delayed in a 14 km loop 122. The light reflected from both FRMs 124 and 126 is at an orthogonal polarization "$p_1$" to the input "$s_1$" light and is combined in coupler 120.

The coupler 120 output is split between a "time shear" path to detector 126 and a return path to the PBS 118. These two time-sheared (time-delayed) optical signals from the short and long paths interfere on the detector 136 and provide a highly accurate measurement of the differential delay (the time shear) between the long and the short path. The detector 136 output is provided as an input to mixers 140 and 142.

The PBS 118 routes the combined short and long path output light from the coupler 120 to port 1 of an optical circulator 128 which couples all that light to the DUT via port 2. The light from both the short and long delays has the identical polarization. So any differences in the phases of the reflected light must be from time variations in the DUT over the time interval between the two delays. The light reflected from the DUT is coupled from port 2 of the circulator 128 to port 3 of the circulator 128 where it is combined with the light from the single reference path in combiner 130. The circulator 128 could be replaced with a coupler to save cost but with some degradation in signal-to-noise ratio.

The polarization controller 116 is present in the single reference path so that the reference light can be split approximately evenly between the s and p states of the PBS 132 connected to the output of the coupler 130. The PBS 132 splits the interfering light so that "$s_2$" polarization light is detected at detector 134 and orthogonal "$p_2$" polarization light is detected at detector 132. The s and p detectors 134 and 138 measure the interference patterns or fringes. The s-polarization detector 134 provides the s-mode interference signal to a mixer 140 and then a low-pass filter (LPF) 144 as well as directly to a low pass filter 146 without any mixing. The p-polarization detector 138 sends the p-mode interference pattern signal to a mixer 142 and then a low-pass filter (LPF) 148 as well as directly to a low pass filter 150 without any mixing.

Figure 16:
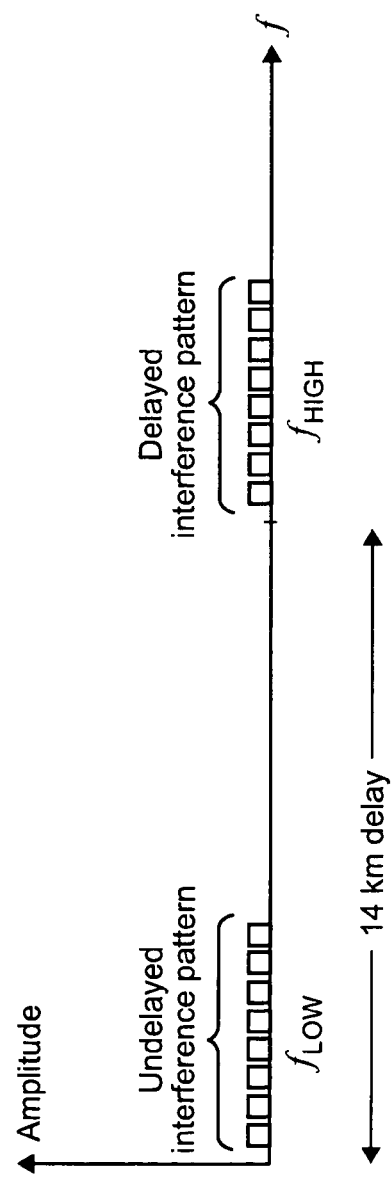
FIG. 16 is a graph illustrating amplitude signals after being Fourier transform for the example embodiment from FIG. 17.

There are two responses for the DUT 40 in the signals arriving a detectors 134 and 138: one DUT response took a short path and another DUT response took a longer path and arrived later. If we assume a distributed DUT, such as a series of Bragg gratings, then the DUT will be distributed along some length or distance. FIG. 16 illustrates the corresponding frequency distribution of these short and long DUT response signals. The more distant an optical path, the higher the frequency of the response interference fringes. Consequently, nearer gratings cause lower frequency interference fringes, and more distant gratings cause substantially higher frequency interference fringes. FIG. 16 illustrates the spectral distribution of these short path and long path signals at detectors 134 and 138.

The long path interference pattern signals are at too high of a frequency to pass through the low-pass filter, and as a result, are removed, leaving just the part of the detected interference pattern signal resulting from the short path. This is referred to as the "near" signal, and there is a near signal for both the s and p detectors: p-near or $p_1$ and s-near or $s_1$. The signals that are connected to the mixers 140 and 142 are mixed with the "shear" interference signal from the detector 136 to frequency translate or downconvert the long path interference pattern signals to baseband, or lower frequencies, while moving the short path delay signals out of baseband to higher frequencies. The time shear signal functions as a local oscillator signal and has a frequency close to that of the far signal, which causes frequency translation of the far signal to baseband. The shear interference signal will track any tuning speed variations such that the far signal will be mapped back to baseband with very high precision. When each mixed signal is then low-pass filtered, only the signals from the long path, referred to as the "far" signal, remain. The far signal for both the s and p detectors include $s_2$ and $p_2$. The four LPF outputs corresponding to interference pattern data from both the long and short paths are provided for processing.

When interrogating Rayleigh Backscatter or Bragg gratings, this polarization state matching is important since any phase differences between the two long and short path probe signals will be interpreted to be caused by time-variations—not polarization dependence. Using a single reference signal means that the two long and short path probe signals are detected in the same polarization.

Figure 17:
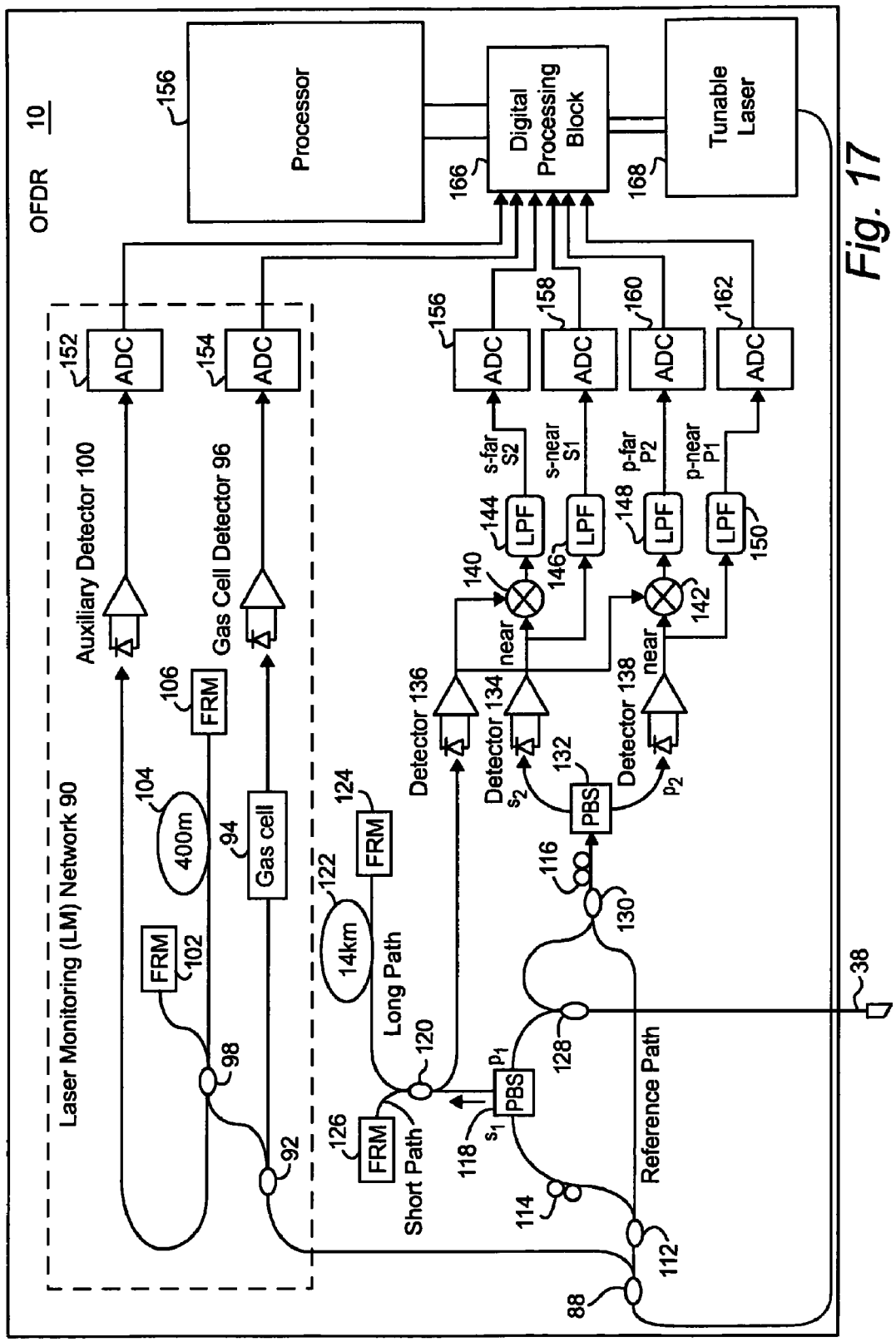
FIG. 17 is a diagram illustrating a sixth example of non-limiting OFDR embodiment.

FIG. 17 is shows a more complete diagram of a single reference path example OFDR embodiment. The circulator 128 has been replaced with coupler 128 to save cost, and the analog detector outputs have been converted into digital format in respective analog-to-digital converters 152-162 for processing in digital processing block 166, which could be but is not limited to a field programmable gate array (FPGA). Details regarding digital signal processing block 166 and the processor 156 will now be described.

Data Processing

As explained in the background, the processing and memory requirements to process interferometric pattern data at high laser tuning speeds and/or for long distance DUTs very substantial. To reduce those requirements, the data set for processing was reduced. A segment of interest for the DUT is identified, and the corresponding data is extracted from the overall interferometeric pattern data. The much smaller extracted data set is then processed.

Figure 18:
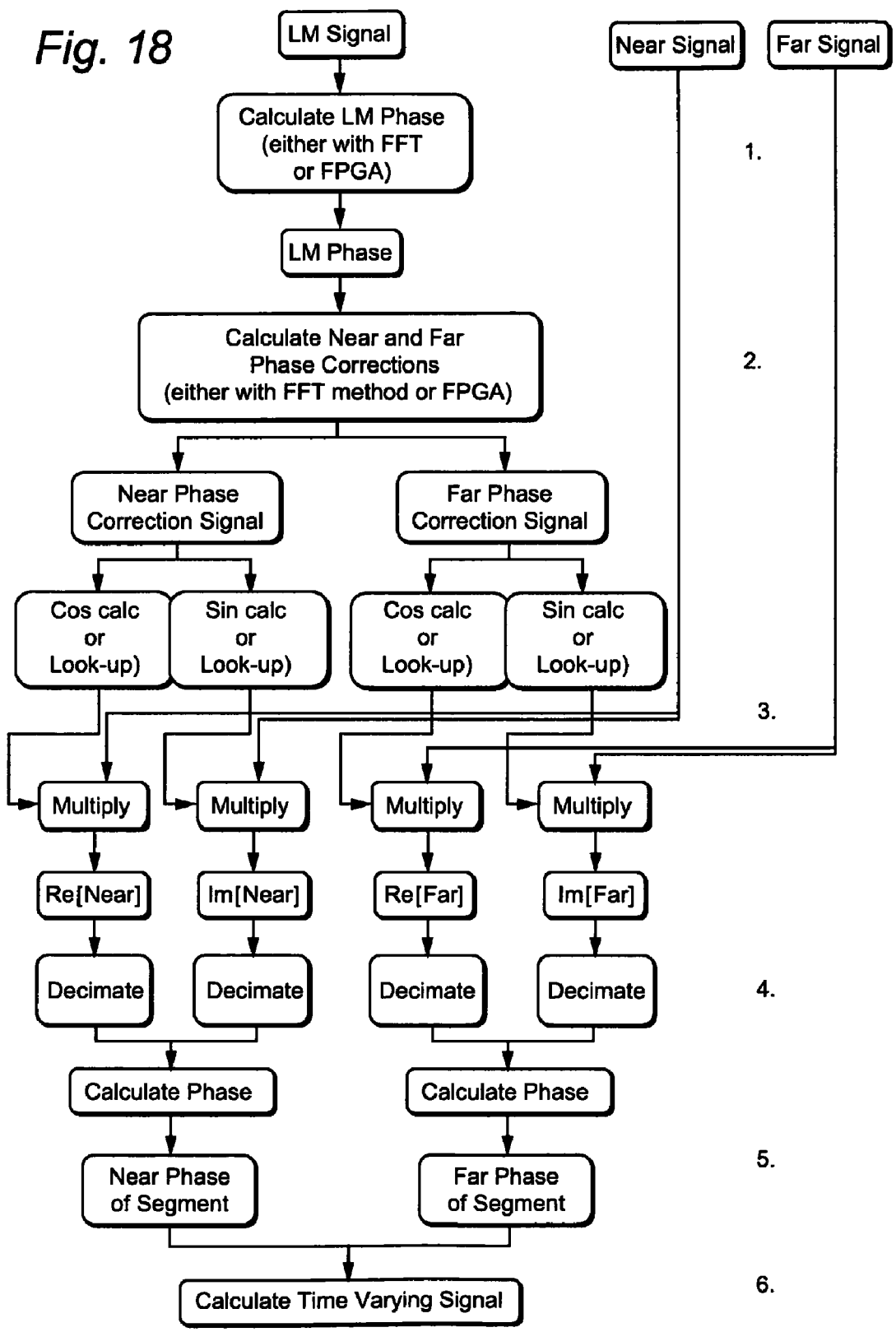
FIG. 18 is an flow diagram of example processing steps for determining time varying phase.

There are six steps diagramed in data processing flow of FIG. 18 that ends in calculating the time varying phase component of the reduced data set. Of those six, the first four steps describe a data reduction process.

1. Forming a laser phase signal from a LM interference signal.
2. Forming near and far path delay phase correction signals from the laser phase signal.
3. Multiplying (or mixing) the delay location back to baseband using the laser phase signal.
4. Low-pass filtering and decimating the mixed signal.
5. Calculating the phase of the near path and far path segments.
6. Calculating the time varying phase for the segment and removing it.

The laser phase signal is the local oscillator (LO) signal needed to frequency translate the DUT segment data down to baseband or low frequencies. The forming of the delay specific signal determines the location of the DUT signal (e.g. 2.752 km) that will be brought back to baseband. The multiplication process is the mixing process that brings this DUT segment to baseband or low frequencies. The low-pass filtering and decimation determine the width or range (e.g. 20 m) of the DUT segment to be analyzed. Then the near and far phase calculations described above are performed on the DUT segment data.

There are a variety of ways to perform this processing. Two non-limiting example methods are described below. The first is called the "Numerical Processing Method" and processes the data in steps 1-4 using numerical calculations in a processor or computer by calculating equations and the like using software computer instructions. The second example method performs many of the processing steps 1-4 in digital signal processing circuitry as the raw data arrives and is called the "Digital Processing Method." The Digital Processing Method is implemented in hardware circuitry.

Software-Based Numerical Signal Processing

1. Laser Phase Calculation

The signals digitized by the analog-to-digital converters 156-162 contain information about optical paths from zero meters out to the total range of the system, which could be 10', 100's, 1000's, or even more meters. It would be advantageous to be able to extract the signal associated with a particular location in the fiber (e.g., 2.752 km) over some specified range (e.g. 20 m) centered on this location. This extraction would greatly reduce the amount of data that must be stored and processed to recover the desired information. The process for doing this segment windowing or interference pattern data extraction first means that the desired signal must be translated to baseband or low frequencies and then low-pass filtered.

Converting to baseband is a process performed in most modern communications systems. In FM and AM radio broadcasts, many stations share the same space, and particular stations are assigned particular frequencies. Each frequency is a perfect sine wave that the transmitting station modifies slightly to encode low frequency audio information on the sine wave. Individual radios reproduce the perfect sine wave at the particular frequency assigned to the transmitter of interest, commonly referred to as the local oscillator (LO) signal, and mix this sine wave or LO signal with the signal received by an antenna. The antenna signal contains signals from numerous radio stations, and a weaker, time-shifted version of the signal from the station of interest. Multiplying, or mixing, the antenna signal with the local oscillator (LO) signal and low-pass filtering this signal selects out the one particular station's signal, and measures the small deviations of the transmitted signal from the perfect sine wave. These small deviations are the signal of interest, which in the radio broadcast context is the audio signal. Signals besides sinewaves can also be used as the base signals or local oscillators in communications systems, but the principle of multiplying and lowpass filtering to select a particular low-bandwidth signal can still be used.

In interferometic measurements in this case, a desirable goal is to extract information uniquely encoded by its delay in the interferometric system. Usually, information about many delay paths is present in the detected interferometric signal, and it would be very advantageous to be able to ignore or remove information associated with delays that are not of interest. The difficulty is that the base signal here, analogous to the sine wave in standard radio systems, is not a sine wave, and is determined by the delay and the tuning characteristics of the interferometer tunable laser. These tuning characteristics are complicated, and generally not reproducible from measurement to measurement.

The innovative approach here provides a process by which the base signal that is determined by the delay and the laser tuning characteristics can be calculated for each laser sweep. That calculated signal is then used to form a local oscillator (LO) signal that will select or extract the specific interferometric information associated with a particular, but arbitrary delay in the interferometric system.

In an OFDR application, such as illustrated in FIG. 16, a longer distance along the distributed DUT means higher frequency. Again, the laser tuning is not perfect, which means the laser will not produce a perfect sine wave. So the digital signal used to mix the desired DUT segment location data back to baseband is constructed using the interference signal coming from the Laser Monitor Interferometer (LMI).

At long distributed DUT distances, and with imperfect lasers, one can no longer assume that the returning light is approximately at the same wavelength as the reference light. In fact one cannot even assume that the tuning rate of the reference light is the same as the tuning rate of the light returning from the DUT. As a result the earlier described methods of processing the fringe data (see e.g., U.S. Pat. Nos. 6,900,897, 6,856,400, 6,566,648, 6,545,760, 6,376,830, 5,798,521) will no longer suffice. Instead, a more accurate method involving a careful accounting of all of the time delays in the optical and electrical systems is required.

FIGS. 19 through 27 highlight optical and electrical signal paths labeled with associated time delays to be used in the reconstruction of the complex time-domain response of the DUT. Assume that the incident laser field has some optical phase, $\phi(t)$. Each signal p(t) measured is the result of interference between two optical paths highlighted in FIG. 19 through 27, and therefore, the measured quantity is always the difference between two delayed versions of the original laser phase, $\phi(t)$. This is required since the laser phase, $\phi(t)$, varies too rapidly to be directly measured. And so, the signal at the LM detector will look like, $$p(t) = p_\tau + p_T - 2\sqrt{p_\tau p_T} \cos(\phi(t-\tau_{LM}) - \phi(t-T_{LM})) \quad (12)$$

Figure 19:
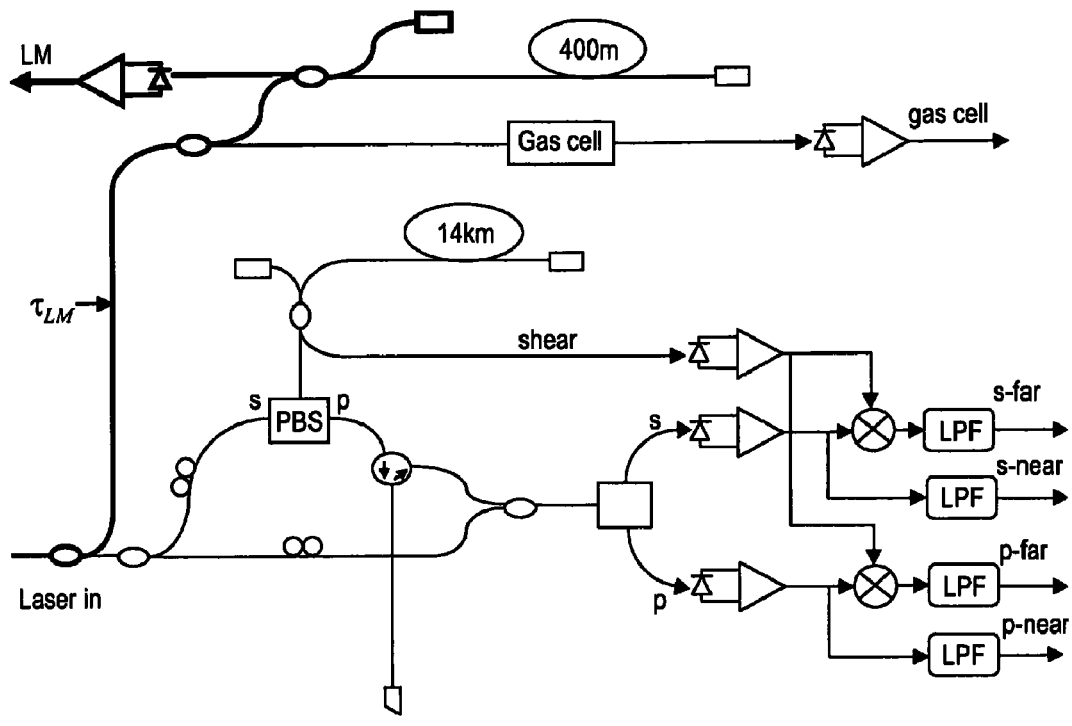
Figure 20:
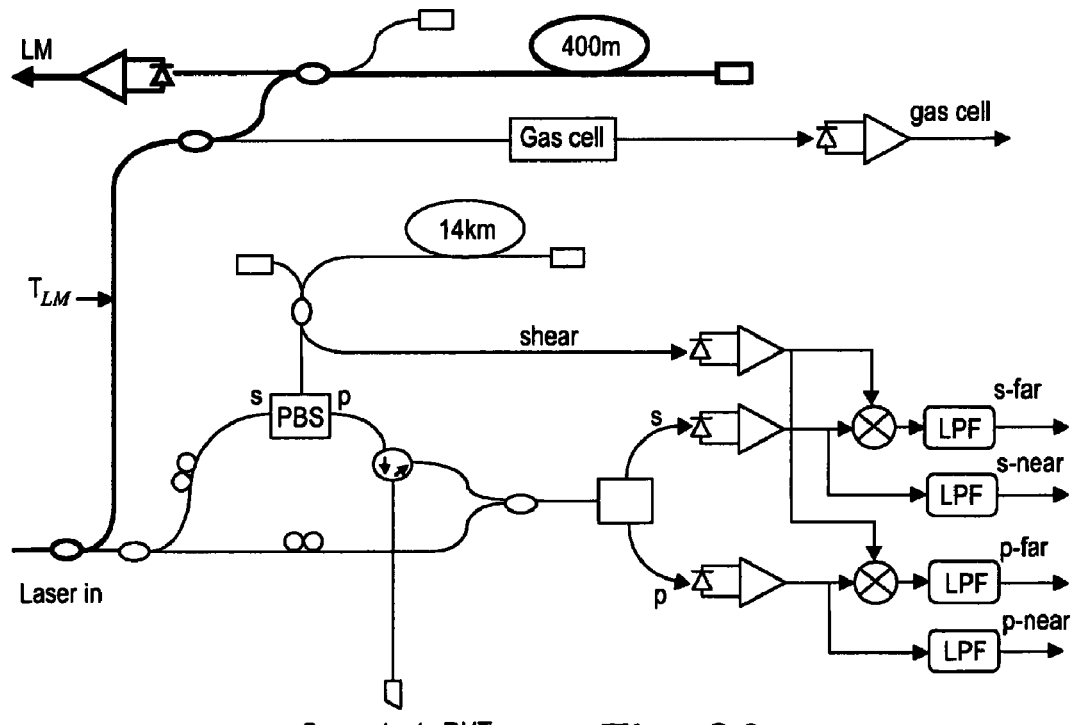
Figure 21:
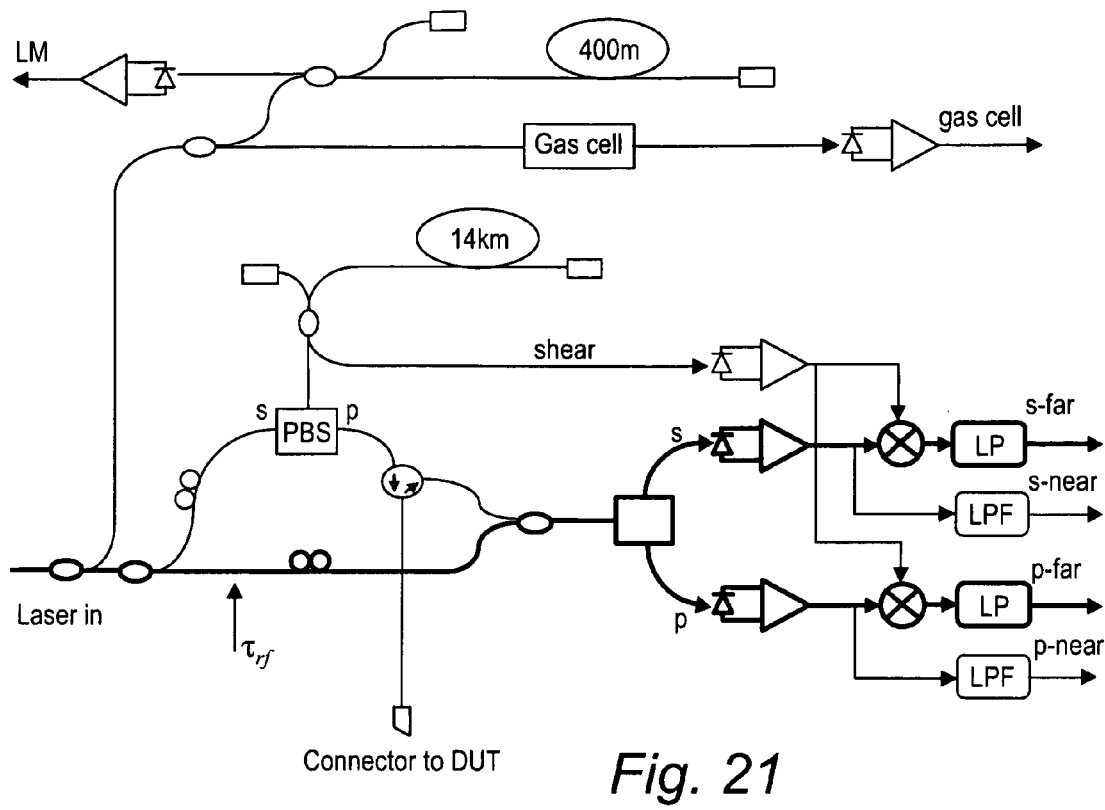
FIGS. 21-27 illustrate various delay paths in a example OFDR.
Figure 22:
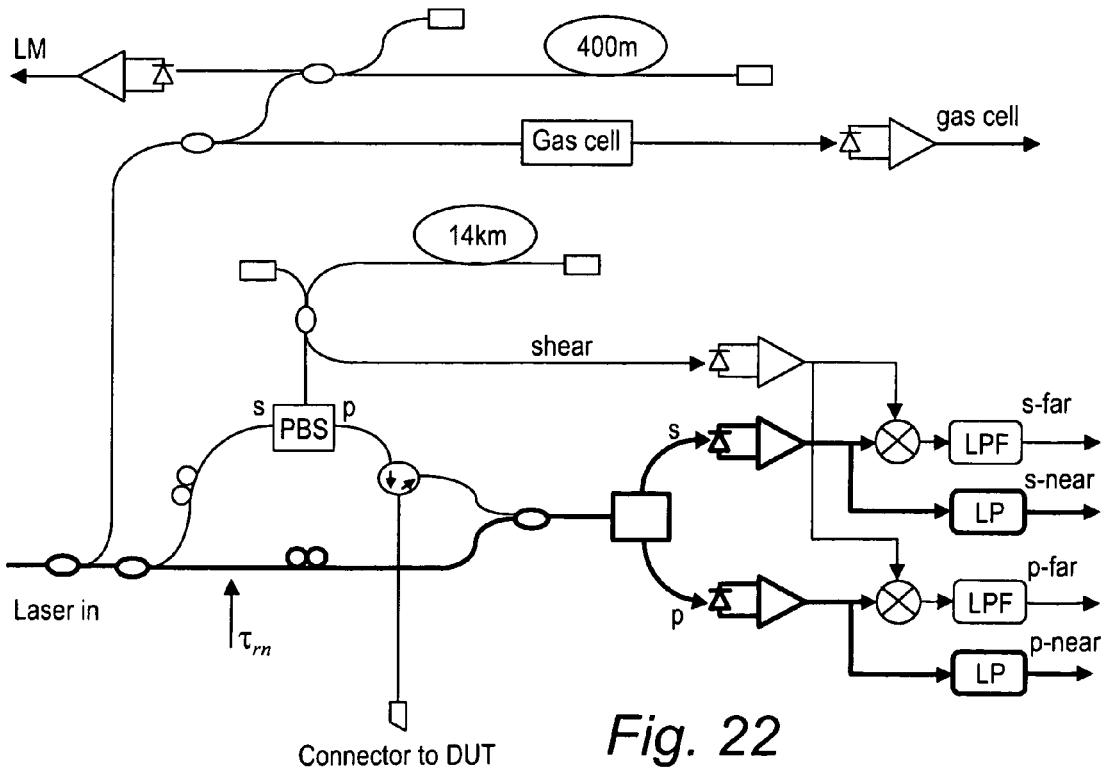
Figure 23:
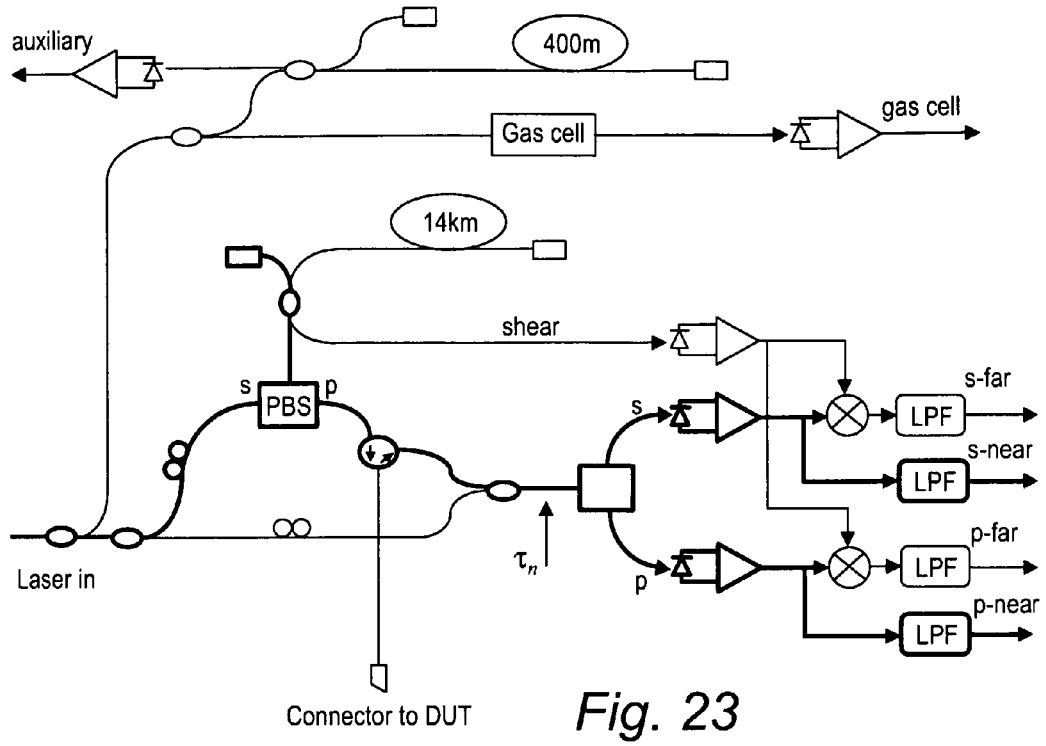
Figure 24:
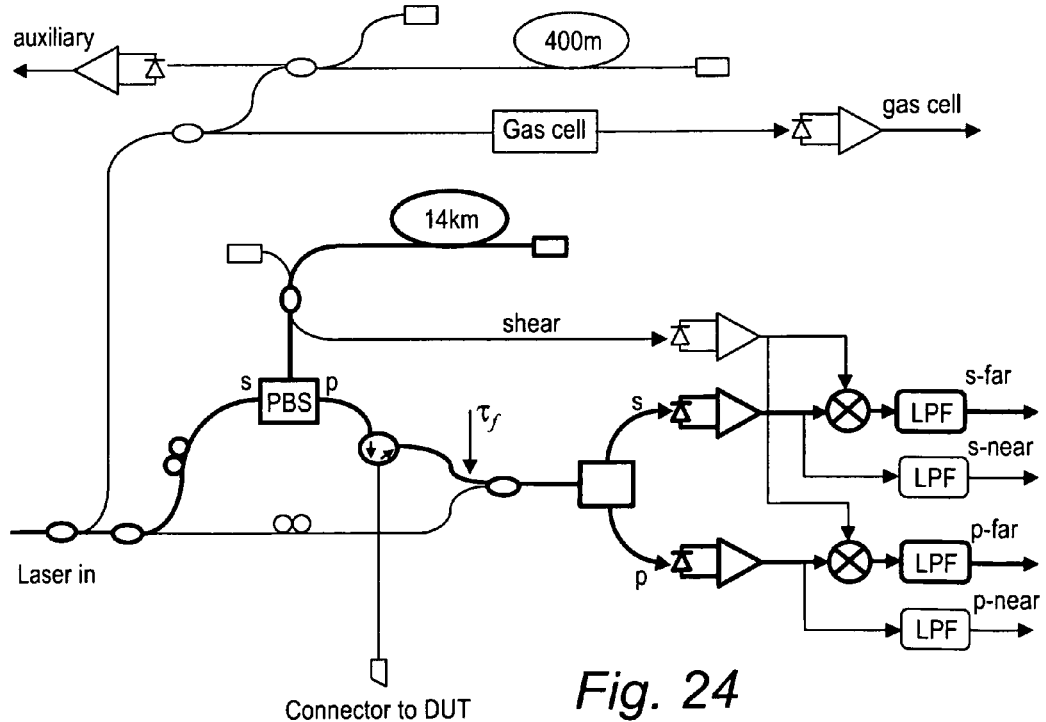
Figure 25:
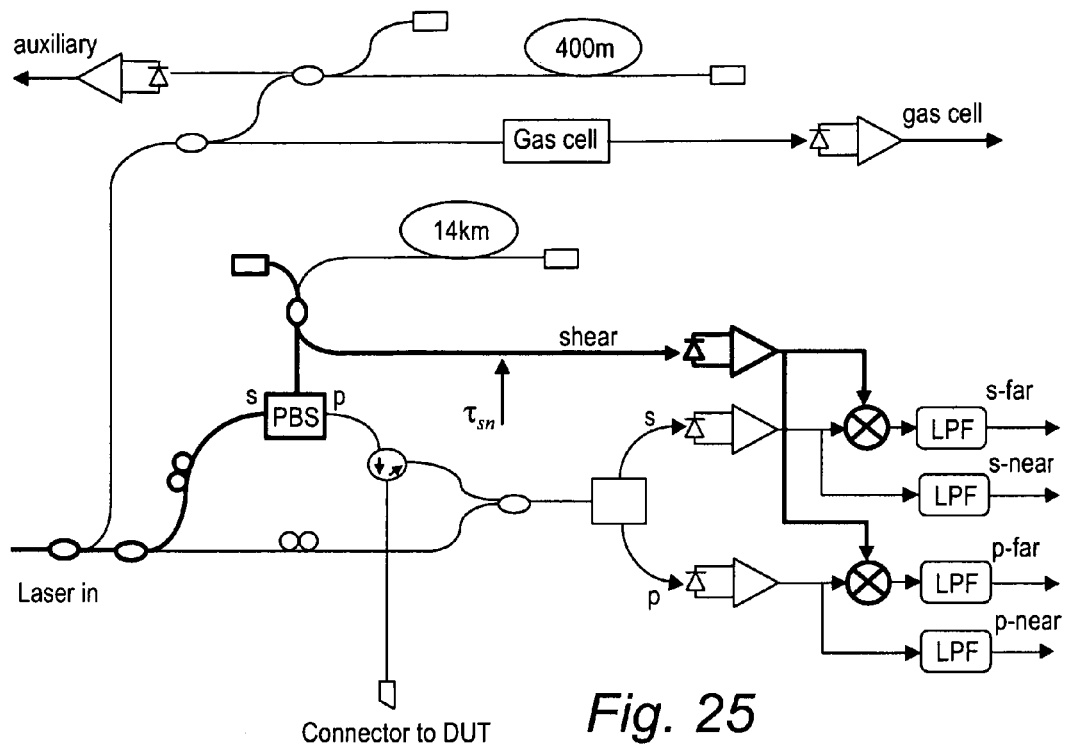
Figure 26:
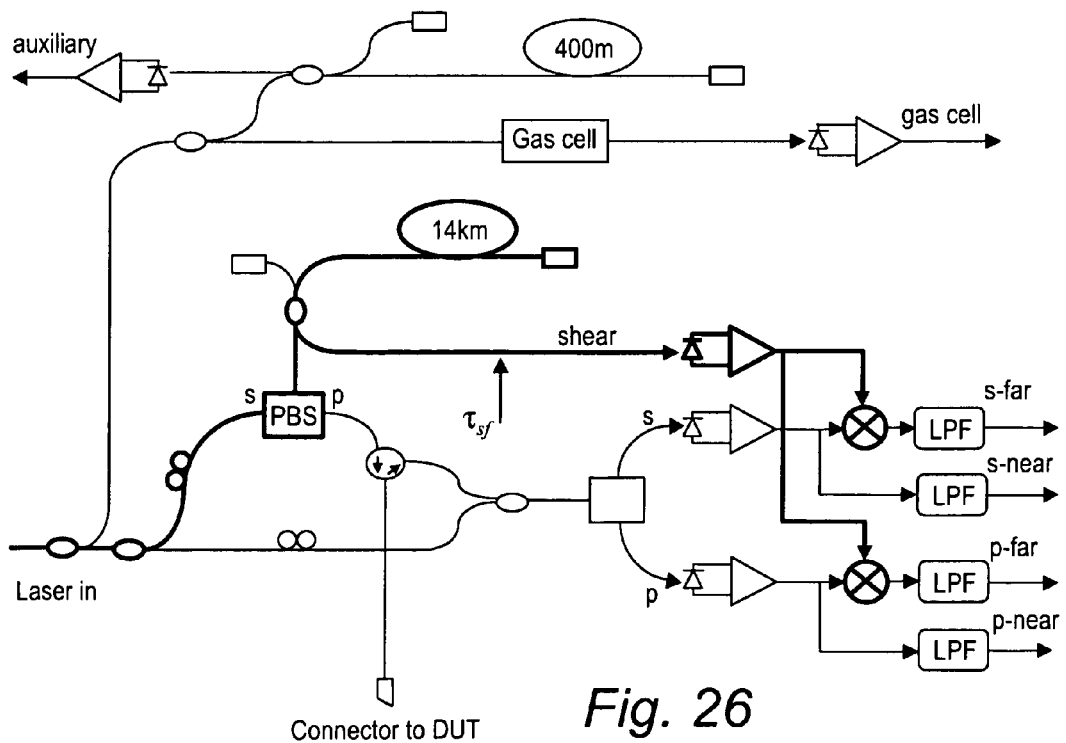
Figure 27:
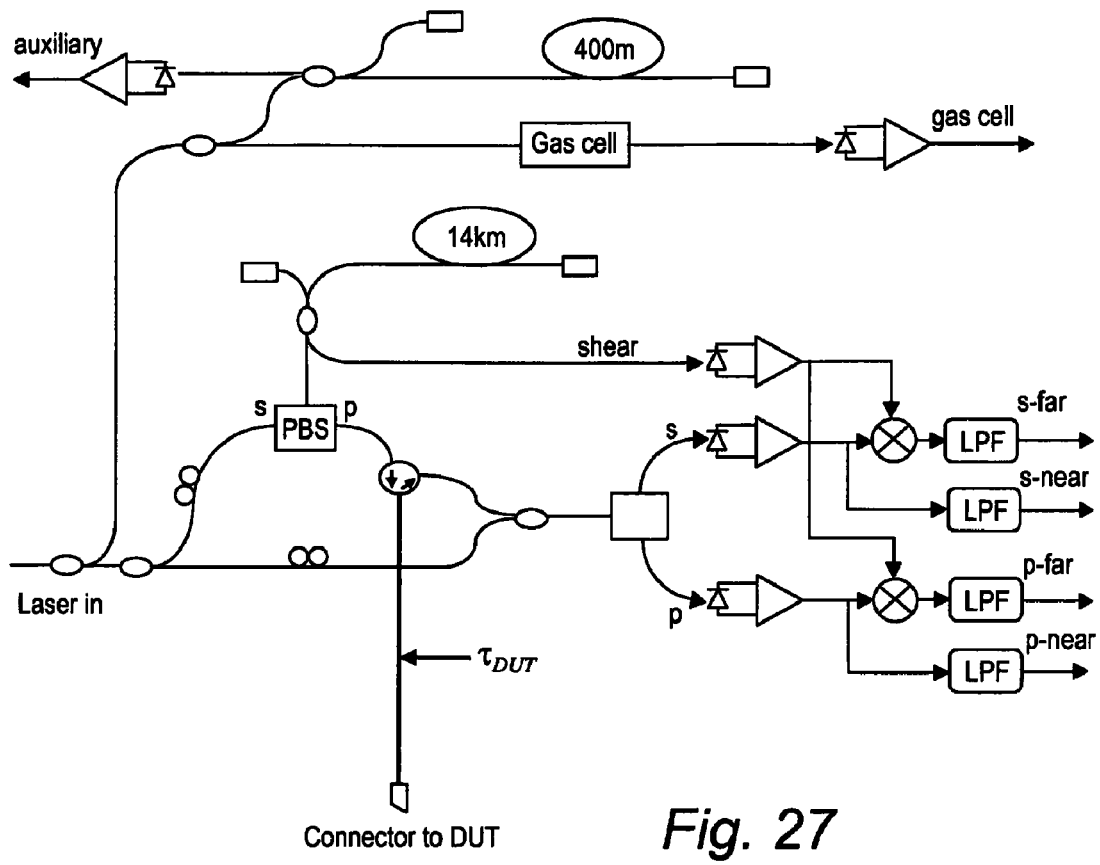

The delays $\tau_{LM}$ and $T_{LM}$ in equation 12 are associated with the paths highlighted in FIGS. 19 and 20, respectively. The powers "p" may be assumed constant or at the very least, slowly varying. With this knowledge, and the knowledge that the laser sweep is monotonic, we can calculate $\phi_{LM}$ from a measured value of p(t), $$\phi_{LM}(t) = \phi(t-\tau_{LM}) - \phi(t-T_{LM}). \quad (13)$$

Taking the Fourier Transform of $\phi_{LM}$ gives, $$\Phi_{LM}(\omega) = (e^{-i\omega\tau_{LM}} - e^{-i\omega T_{LM}})\Phi(\omega) \quad (14)$$

and if we want to recover the laser phase, $$\frac{\Phi_{LM}(\omega)}{e^{-i\omega\tau_{LM}} - e^{-i\omega T_{LM}}} = \Phi(\omega) \quad (15)$$

Figure 28:
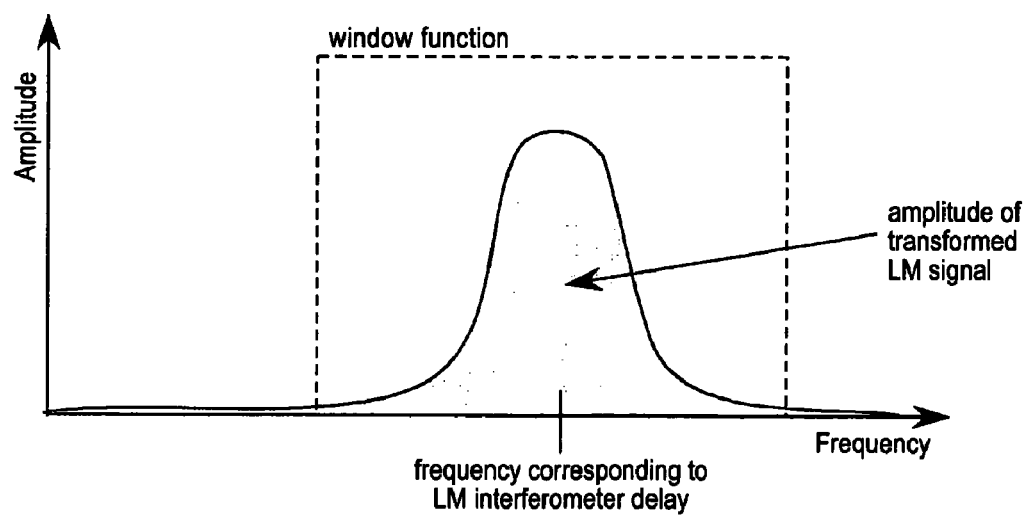
FIG. 28 illustrates windowing function.
Figure 29A:
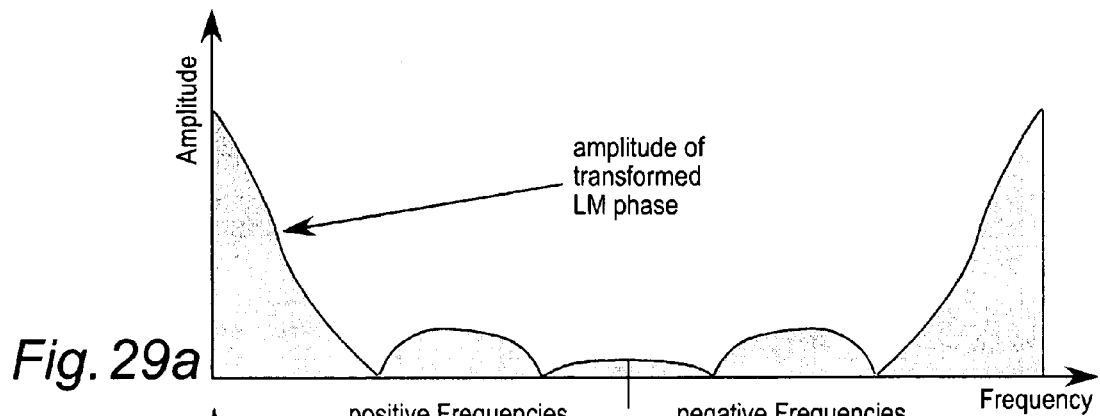
FIG. 29 illustrate three graphs related to the amplitude of transformed LM phase.
Figure 29B:
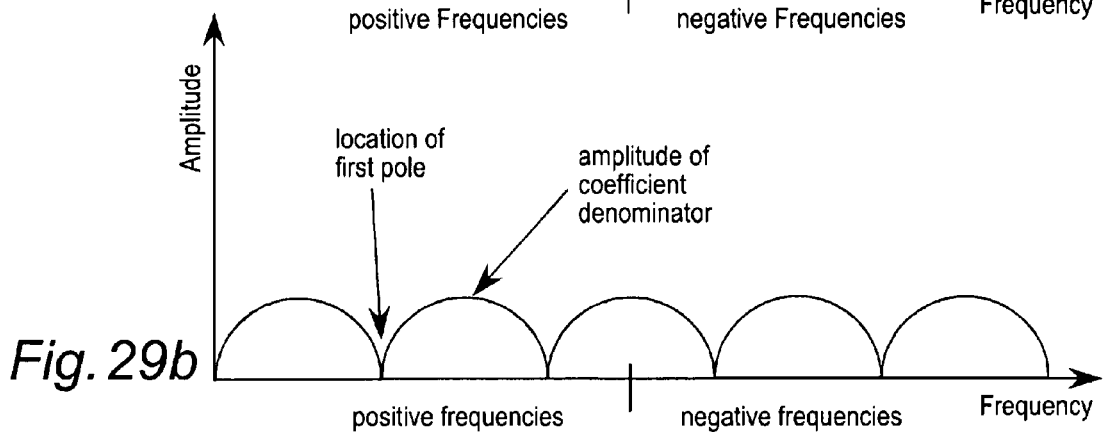
Figure 29C:
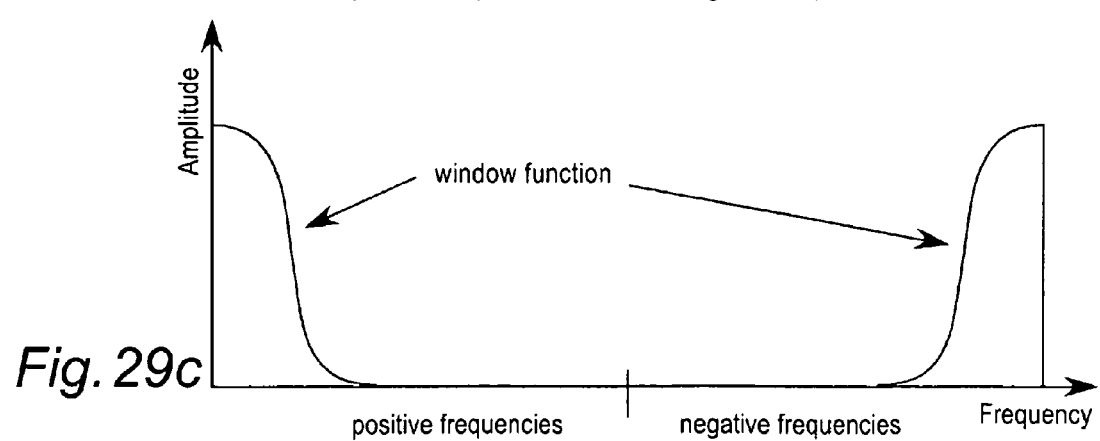

To calculate the laser phase numerically, given these equations, the interference signal present at the LM detector is transformed into the frequency domain using a Fourier transform. A segment or portion of the transformed data that is of interest is then windowed around the frequency peak at the location corresponding to the delay associated with the LM interferometer. The windowing extracts only the data associated with the positive frequencies of the laser monitor interferometer. The windowing is achieved by multiplying the transformed data by a window function centered at the peak location and wide enough to encompass the peak (see FIG. 28). Many different window functions could be used, ranging from a simple square wave type window (as shown in FIG. 29) to a more complicated Blackman window. An inverse transform then takes this windowed data back to the time domain. The phase of the resulting complex data is then calculated as a function of time using a four quadrant arc tangent to convert the real and imaginary parts of each entry in the extracted data array to a phase, and a commonly known "phase unwrap" method that adjust the phase that is limited to a 0 to $2\pi$ range to the larger range needed to represent the total tuning and stored in memory. The laser monitor phase (LM) is actually the difference between two time-shifted versions of the laser phase as described by equation 13. To calculate the laser phase from the extracted LM, the LM phase is divided by the denominator shown in equation 15. When performing these calculations numerically, however, the LM phase can also be used as will be shown below.

2. Calculating Near and Far Delay Phases

The next data processing step involves calculating the phases specific to the delays associated with the detected un-delayed (short path or near) and delayed (long path or far) interference pattern signals. The near and far phases can be related to the laser phase using similar relationships as for the LM phase. These relationships are shown below. Assume that the s and p channels have been constructed to be identical in delays, and we will therefore only treat the s terms, with the understanding that the p terms are identical. The paths for the individual path delays, $\tau_{rn}$, $\tau_n$, $\tau_{DUT}$, $\tau_{rf}$, $\tau_f$, $\tau_{sn}$, and $\tau_{sf}$ are highlighted in FIGS. 21-27.

$$\phi_{snear}(t) = \phi(t-\tau_{rn}) - \phi(t-\tau_n-\tau_{DUT}) \quad (16)$$

$$\phi_{sfar}(t) = \phi(t-\tau_{rf}) - \phi(t-\tau_f-\tau_{DUT}) - \phi(t-\tau_{sn}) + \phi(t-\tau_{sf}) \quad (17)$$

where $\phi_{snear}$ is the phase measured for the near path through the DUT, and $\phi_{sfar}$ is the phase measured for the far path through the DUT.

Taking the Fourier transform of equations 16 and 17 yields:

$$\Phi_{snear}(\omega) = [e^{-i\omega\tau_{rn}} - e^{-i\omega(\tau_n+\tau_{DUT})}]\Phi(\omega) \quad (18)$$

and $$\Phi_{sfar}(\omega) = [e^{-i\omega\tau_{rf}} - e^{-i\omega(\tau_f+\tau_{DUT})} - e^{-i\omega\tau_{sn}} + e^{-i\omega\tau_{sf}}]\Phi(\omega) \quad (19)$$

where, $\omega$ is the frequency, $\Phi(\omega)$ is the Fourier Transform of the phase of the laser signal, and $\Phi_{sfar}(\omega)$ is the Fourier Transform of the phase of the signal present for a delay path specified by $\tau_{DUT}$.

Using the relationship between the LM phase and the laser phase shown above, one can derive equations relating the near and far phases to the LM phase.

$$\Phi_{snear}(\omega) = \frac{e^{-i\omega\tau_m} - e^{-i\omega(\tau_n + \tau_{DUT})}}{e^{-i\omega\tau_{LM}} - e^{-i\omega T_{LM}}} \Phi_{LM}(\omega) \quad (20)$$

$$\Phi_{sfar}(\omega) = \frac{e^{-i\omega\tau_{rf}} - e^{-i\omega(\tau_f + \tau_{DUT})} - e^{-i\omega\tau_{sn}} + e^{-i\omega\tau_{sf}}}{e^{-i\omega\tau_{LM}} - e^{-i\omega T_{LM}}} \Phi_{LM}(\omega) \quad (21)$$

where, $\Phi_{LM}(\omega)$ is the Fourier transform of the laser monitor phase, and $\tau_{LM}$ and $T_{LM}$ are the delays through the paths highlighted in FIGS. 19 and 20.

The calculated LM phase from the LM interference signals is first transformed into the frequency domain using a complex Fourier transform. This transformed phase is then multiplied by the near and far complex coefficients relating the LM phase to the near and far phases as shown in equations 20 and 21. Because there are poles in these coefficients when the denominator goes to zero, (see FIG. 29 at graph (b)), the data is windowed such that it goes to zero at frequencies at and after the first pole. For example, a window function formed by a Hanning window that has a value of one at D.C. and goes to zero at the first pole and there after can be used to multiply the data in the transform domain. See FIG. 29.

Figure 30:
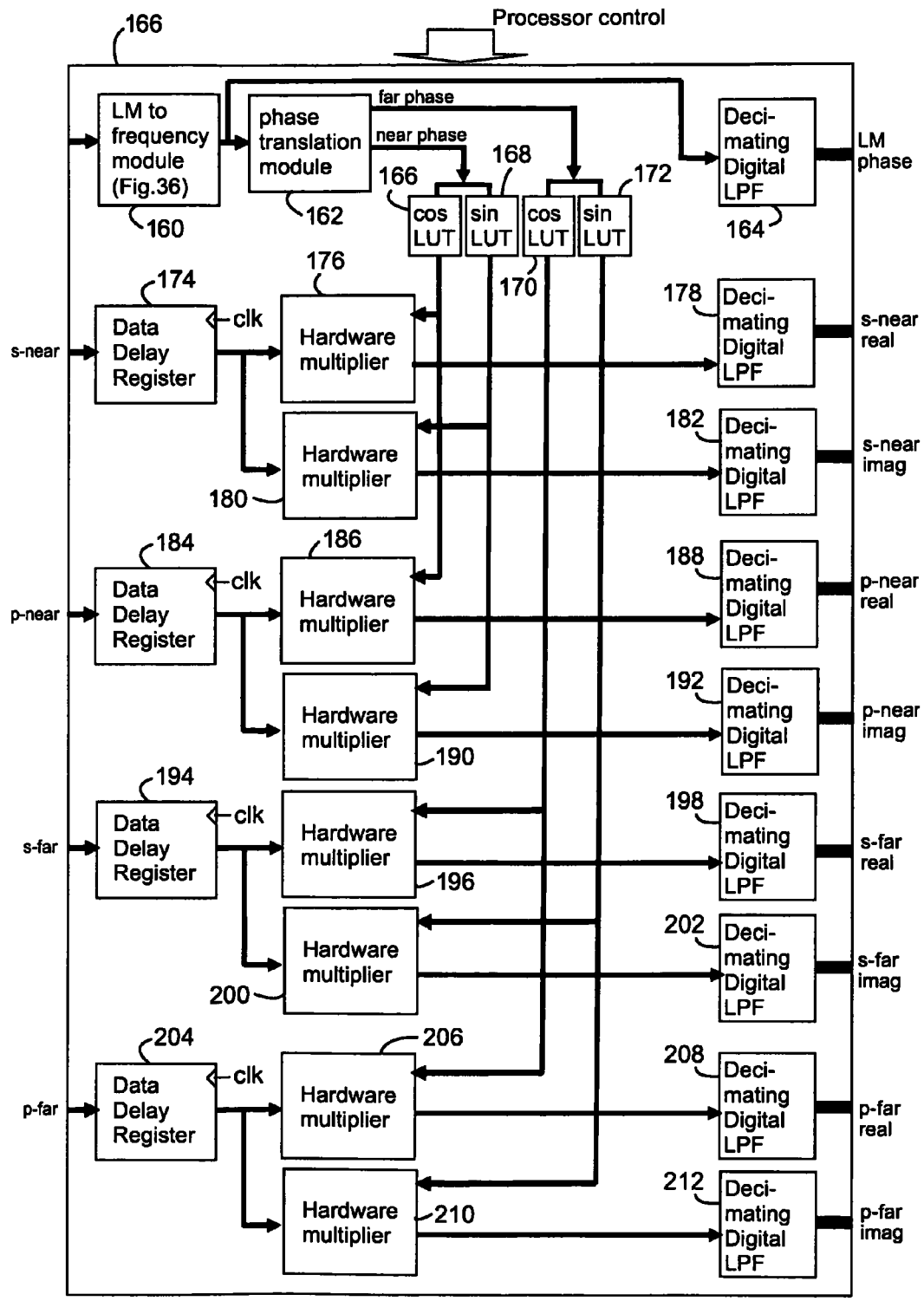
FIG. 30 is a function block diagram of a digital signal processing block as an example preferred (but not limiting) implementation for reducing the data set size, processing time, and memory requirements.

In doing this processing, both positive and negative frequencies must be included and windowed. When an FFT is performed on a real data set, the positive frequencies appear in the first half of the data and the negative frequencies appear in the second half of the data, as shown in FIG. 30 at graph (a). To window both halves, a window is used that windows both the positive and negative frequencies, as shown in FIG. 29 (c). Here the window function for the negative frequencies is the mirror of the window function for the positive frequencies.

After the near and far data phases have been calculated and windowed appropriately, the two data sets are then transformed back into the time domain to form the phases specific to the near and far signals.

3. Numerical Mixing to Baseband

Once the near and far phases have been calculated, the original near and far interferometric data sets can be mixed with the cosine and sine of these phases to bring the desired location to baseband. The measured near and far signals can be expressed as $$s_{near}(t) = \cos\left[\phi_{near}(t) + \theta(\omega(t)) + \beta(t)\right] \quad (22)$$

and $$s_{far}(t) = \cos\left[\phi_{far}(t) + \theta(\omega(t-\Delta)) + \beta(t)\right] \quad (23)$$

To frequency translate the desired segment of DUT to baseband, the measured near and far signals are multiplied by the sine and cosine of the near and far phases as shown:

$$\text{Re}\{s_{near,mixed}\} = \cos[\varphi_{near}(t) + \theta(\omega(t)) + \beta(t)] \cdot \cos[\varphi_{near}(t)] \quad (24)$$

$$= \frac{1}{2}\cos[\theta(\omega(t)) + \beta(t)] + $$

$$\frac{1}{2}\cos[2\varphi_{near}(t) + \theta(\omega(t)) + \beta(t)]$$

$$\text{Im}\{s_{near,mixed}\} = \cos[\varphi_{near}(t) + \theta(\omega(t)) + \beta(t)] \cdot \sin[\varphi_{near}(t)] \quad (25)$$

$$= \frac{1}{2}\sin[\theta(\omega(t)) + \beta(t)] + $$

$$\frac{1}{2}\sin[2\varphi_{near}(t) + \theta(\omega(t)) + \beta(t)]$$

$$\text{Re}\{s_{far,mixed}\} = \cos[\varphi_{far}(t) + \theta(\omega(t-\Delta)) + \beta(t)] \cdot \cos[\varphi_{far}(t)] \quad (26)$$

$$= \frac{1}{2}\cos[\theta(\omega(t-\Delta)) + \beta(t)] + $$

$$\frac{1}{2}\cos[2\varphi_{near}(t) + \theta(\omega(t-\Delta)) + \beta(t)]$$

$$\text{Im}\{s_{far,mixed}\} = \cos[\varphi_{far}(t) + \theta(\omega(t)) + \beta(t)] \cdot \sin[\varphi_{far}(t)] \quad (27)$$

$$= \frac{1}{2}\sin[\theta(\omega(t-\Delta)) + \beta(t)] + $$

$$\frac{1}{2}\sin[2\varphi_{far}(t) + \theta(\omega(t-\Delta)) + \beta(t)]$$

4. Low Pass Filtering and Decimating

With the desired segment of DUT signals at baseband, they are low pass-filtered using a decimating filter. In the equations above, the second term in the expression has a frequency of twice the original. When the signal is low-pass filtered, this term is eliminated yielding:

$$\text{Re}\{s_{near,mixed}\} = \frac{1}{2}\cos[\theta(\omega(t)) + \beta(t)] \quad (28)$$

$$\text{Im}\{s_{near,mixed}\} = \frac{1}{2}\sin[\theta(\omega(t)) + \beta(t)] \quad (29)$$

$$\text{Re}\{s_{far,mixed}\} = \frac{1}{2}\cos[\theta(\omega(t-\Delta)) + \beta(t)] \quad (30)$$

$$\text{Im}\{s_{far,mixed}\} = \frac{1}{2}\sin[\theta(\omega(t-\Delta)) + \beta(t)] \quad (31)$$

The original near and far interference measurement data was sampled at a high sampling rate, or a fine time increment, so that the bandwidth was sufficient for the long delays. Now that the data is in baseband and has been filtered, it can be decimated to, in effect, reducing the sampling rate or increase the time increment. This has the effect of selecting the desired section of DUT fiber in the data set with a total length determined by the decimation factor. This process significantly reduces the data size for storage and further processing. For example, any number of known filter functions can be used to low pass filter and decimate these data sets numerically.

5. Calculating Phase of Near Path and Far Path Segments

The phases of the near and far signals calculated in step 4 above are calculated using a four quadrant arctangent and the real and imaginary parts of the near and far signals. These near and far phases now correspond to the phase signals, $\phi(t)$ and $\phi'(t)$, respectively described in equations 1 and 2 above.

6. Calculating and Removing Time Varying Phase

The two phase signals calculated in step 5 above can then be used as described in equations 3 through 10 above to calculate the time varying phase of the DUT path. This calculation involves the time shifting of the far phase as described in equation 3, the subtraction of the two phases as described in equation 4, and the coversion of this phase difference into the time-varying component of the phase as described in equations 5 or 10, (equation 10 is a more precise calculation).

Hardware-Based Digital Signal Processing (DSP) Approach

The software based numerical processing described above requires that the entire interferometric data set be mathematically transformed several times. Because there can be more that ten million points per data set for long DUTs, this can be a very resource consuming process in terms of time, data processing operations, and memory. It can be viewed as a "brute force" approach. An alternative and more efficient approach described below digitally processes signals as they arrive at appropriately configured digital signal processing circuitry. FIG. 30 shows a schematic of a non-limiting example of such configured digital processing circuitry which can be implemented, if desired, as a field programmable gate array (FPGA). The processing steps to be implemented by the digital processing are the same as described above for the software based numerical processing approach, but the processing is accomplished differently and more efficiently as described below.

In general, the digital signal processing hardware, in this non-limiting example an FPGA 166, selects or extracts the data associated with a desired segment of a DUT fiber to be analyzed and in this way greatly reduces the amount of data to be processed. The Laser Monitor (LM) interferometric signal enters the FPGA as a digital number from an analog-to-digital converter. This sequence of numbers representative of power at the LM detector is translated into a series of numbers representative of the phase derivative (frequency) of the signal present at the LM detector. The center location of the DUT fiber segment is determined by interferometric digital data stored in a shift register (there is a shift register for each light intensity detector) which is loaded into a phase translation module. The width of the DUT segment is determined by a cut-off frequency of a decimating digital low-pass filter (the cut off frequency can be programmed via the processor). This phase derivative is also re-scaled inside a LM-to-freq module to account for the length (delay) of the LM interferometer.

Referring to the digital processing block 166 shown in FIG. 30, the four input signals include the laser monitor signal (LM signal), the two sets of interference signals for the two detected polarization states, s and p, that took the near path, and the two interference signals for the two detected polarization states, s and p, that took the far path. The LM signal is converted to an estimation of the phase derivative of the laser phase by the LM to frequency module 160, that is described in more detail below and in FIG. 36. The phase derivative signal enters a phase translation module 162 that calculates the expected phase values for delays matching the near and far phase terms, also described below and in FIG. 37. The calculated near phase is used to address a pair of look-up tables for the cosine 166 and the sine 168. The calculated far phase is used to address a pair of look-up tables for the cosine 170 and the sine 172.

The output of the near cosine look-up table is then multiplied by the near s polarization signal delayed through the data delay register 174 to compensate for the latency in the LM to frequency module 160. The multiplication is carried out by a hardware multiplier 176, the output of which feeds a decimating, digital, low-pass filter (LPF) 178. The output of this filter is the real value of the near s polarization signal at the DUT delay of interest. The output of the near sine look-up table is then multiplied by the near s polarization signal delayed through the data delay register 174 to compensate for the latency in the LM to frequency module 160. The multiplication is carried out by a hardware multiplier 180, the output of which feeds the decimating, digital, low-pass filter (LPF) 182. The output of this filter is the imaginary value of the near s signal at the delay of interest.

The output of the near cosine look-up table is then multiplied by the near p polarization signal delayed through the data delay register 184 to compensate for the latency in the LM to frequency module 160. The multiplication is carried out by a hardware multiplier 186, the output of which feeds the decimating, digital, low-pass filter (LPF) 188. The output of this filter is the real value of the near p polarization signal at the delay of interest. The output of the near sine look-up table is then multiplied by the near p polarization signal delayed through the data delay register 184 to compensate for latency in the LM to frequency module 160. The multiplication is carried out by a hardware multiplier 190, the output of which feeds the decimating, digital, low-pass filter (LPF) 192. The output of this filter is the imaginary value of the near s polarization signal at the DUT delay of interest.

The output of the far cosine look-up table is multiplied by the far s polarization signal that has been delayed through the data delay register 194 to compensate for the latency in the LM to frequency module 160. The multiplication is carried out by a hardware multiplier 196, the output of which feeds the decimating, digital, low-pass filter (LPF) 198. The output of this filter is the real value of the far s polarization signal at the DUT delay of interest. The output of the far sine look-up table is then multiplied by the far s polarization signal delayed through the data delay register 194 to compensate for the latency in the LM to frequency module 160. The multiplication is carried out by a hardware multiplier 200, the output of which feeds the decimating, digital, low-pass filter (LPF) 202. The output of this filter is the imaginary value of the far s polarization signal at the delay of interest.

The output of the far cosine look-up table is then multiplied by the far p polarization signal delayed through the data delay register 204 to compensate for the latency in the LM to frequency module 160. The multiplication is carried out by a hardware multiplier 206, the output of which feeds the decimating digital low-pass filter (LPF) 208. The output of this filter is the real value of the far s polarization signal at the DUT delay of interest. The output of the far sine look-up table is then multiplied by the far p polarization signal delayed through the data delay register 204 to compensate for the latency in the LM to frequency module 160. The multiplication is carried out by a hardware multiplier 210, the output of which feeds the decimating digital low-pass filter (LPF) 212. The output of this filter is the imaginary value of the near s signal at the DUT delay of interest.

1. DSP Laser Monitor Processing

Digital signal processing can be used to advantage to convert the laser monitor (LM) interference signal to a phase signal as the signal arrives at the FPGA 166 without having to Fourier Transform the data. This simpler conversion can be achieved with just a small level of latency in the FPGA logic.

Figure 31:
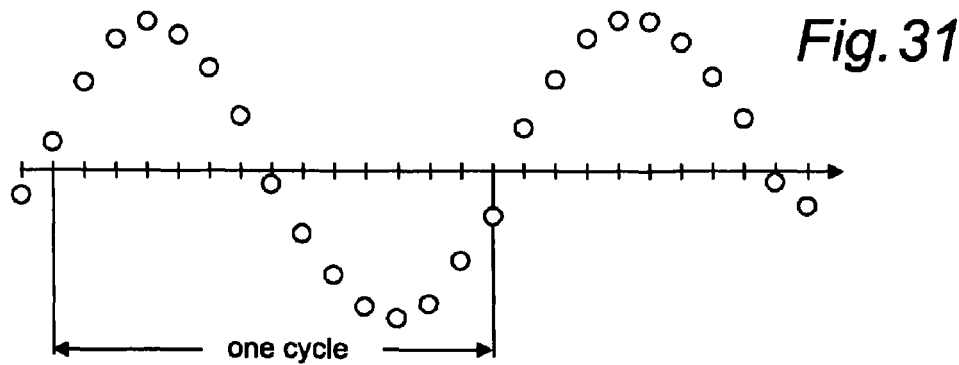
FIG. 31 is a graph of samples as a detected and digitized LM data signal.
Figure 32:
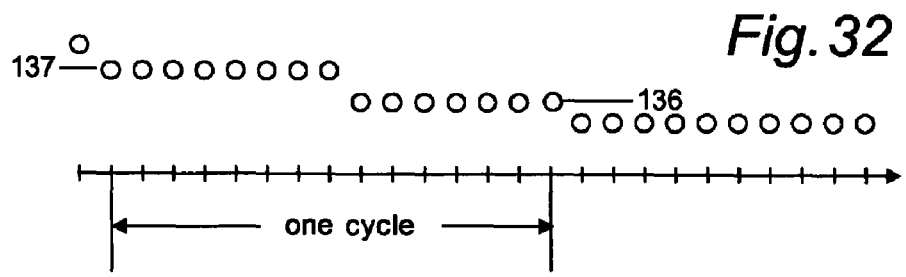
FIG. 32 is graph of an example derivative of the phase as calculated from the signal in FIG. 31.

FIG. 31 illustrates the signal arriving from the LM interferometer detector 100. Each rising edge of the LM interferometer detector sine wave signal, which is here illustrated to be the first positive point following a negative point, represents one cycle, or $2\pi$ radians. Given the discrete values and binary data representations within the digital circuits, a power of 2 is used to represent one full cycle, as is typically done in digital synthesis. FIG. 32 shows the derivative of the phase as calculated from the signal in FIG. 31. One cycle, as defined by this rising edge definition (above), is 15 clock or sample periods. Choosing an 11-bit representation of the phase, then the average increment in phase for the 15 samples is:

$$\Delta\varphi_{ave} = \frac{2^n - 1}{N} = \frac{2^{11} - 1}{15} = 136.5333333\ldots \quad (31)$$

But these are integer computations, so the fractional part cannot be handled directly. Instead, the remainder 8 of the division $(2^{11}-1)/15$ is distributed among the 15 samples in the period of the fringe leaving 7 entries of 136, 8 entries of 137, and average value of 136.5333 . . . . Since division is a costly digital operation in time and resource, a look-up table is constructed matching the number of samples in a cycle with the base value (e.g. 136) and the number of incremented value (e.g. 8 entries of 136+1). For a given interferometer length, sample speed, tuning rate and tuning variation, the number of possible samples per cycles can be calculated, and is typically in the hundreds, and so the table is of manageable size.

Figure 33:
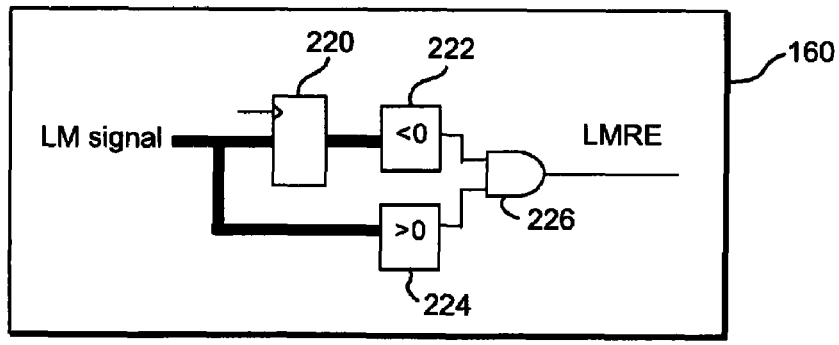
FIG. 33 is a function block diagram of a digital circuit that may be used to detect rising zero crossings of digitized signals.
Figure 34:
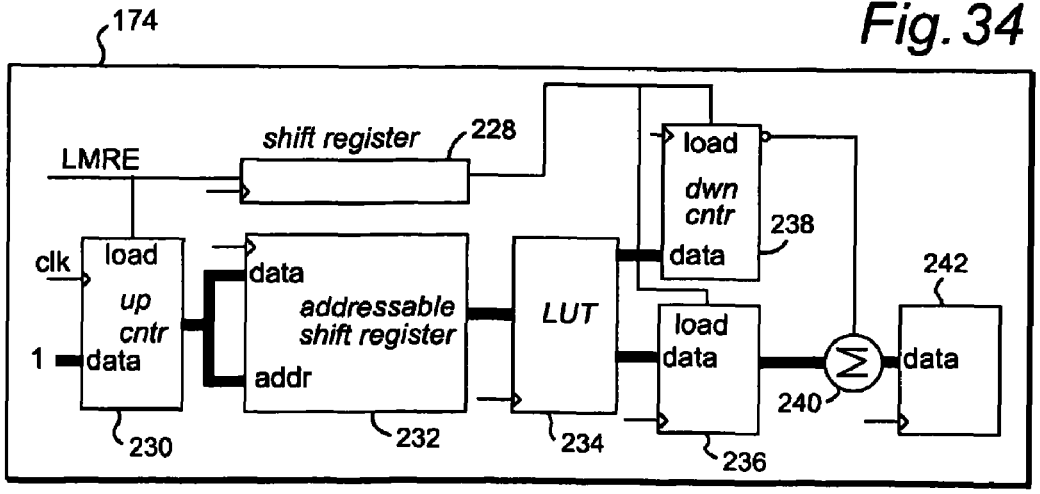
FIG. 34 is a function block diagram of a digital circuit that may be used to calculate the phase derivative signal from the rising zero crossing signal determined in FIG. 33.

FIGS. 33 and 34 show a digital schematic of one possible way to implement this algorithm in digital hardware. FIG. 33 converts each rising edge of the digitized waveform into a single digital high level for one clock cycle using a delay latch 220 to store the LM sample at each clock. The delayed sample is compared to zero in the digital comparator 222, and if the value is greater than 0, the comparator 222 produces a one, and otherwise a zero. The current sample is compared to zero in the digital comparator 224, and if the value is less than 0, comparator 224 produces a one, and otherwise a zero. The comparator outputs are ANDed in gate 226 to produce a signal representing a Laser Monitor Rising Edge (LMRE) signal. This conversion of the analog interference signal into a series of zero-crossing digital pulses could also be achieved with an analog comparator prior to the digital circuitry.

FIG. 34 shows the processing of this digital pulse train of zero crossings. At each pulse, a counter 230 is reinitialized to one and then begins counting the number of clock cycles until the next pulse arrives. When the next pulse arrives, the count value addresses a position in an N-position long, p-bit wide shift register 232. One non-limiting of N is around 256. The counter value is also the data value written into the shift register 232. The length of the shift register, N, must be at least as long as the longest period of the laser monitor LM interferometer.

The rising edge pulse sequence also goes into an N-position shift register 228. When a pulse shifts out of the N-position shift register 228, the number on the output of the p-bit wide shift register is used to address a look-up table 234 that contains the quotient and remainder of the division of the digital number representing one period in phase and the number of clock-cycles in the period (the address). The remainder is loaded into a down counter 238, and as long as the down counter 238 is greater than zero, one is added to the quotient in summer 240. When the value of the down counter drops below zero, zero is added to the quotient number in summer 240. This fills a shift register 242 with the derivative of the LM phase.

The derivative of the LM phase is stored in the register 242 as an "array." Recall that the desired signal is the phase of the laser field. We can increase the accuracy of the laser phase signal produced by the circuit shown in FIG. 34 by processing it with a digital filter that has a complex spectrum correcting for the effects of the measurement approach. Also, recall that the relationship between the LM phase and the laser phase is given by:

$$\frac{\Phi_{LM}(\omega)}{e^{-i\omega\tau_{LM}} - e^{-i\omega T_{LM}}} = \Phi(\omega) \quad (32)$$

This is a nice analytic result, but there is a pole at zero. As a result, φ grows too rapidly. If, instead, we calculate the derivative of the laser phase, we get, $$\frac{i\omega\Phi_{LM}(\omega)}{e^{-i\omega\tau_{LM}} - e^{-i\omega T_{LM}}} = i\omega\Phi(\omega). \quad (33)$$

Here, there is a zero canceling the pole at zero, and the expression can be calculated. If $\tau_{LM}$ is zero, then the Taylor expansion of the transfer function may be calculated as follows:

$$\left(\frac{1}{T_{LM}} - \frac{i\omega}{2} - \frac{T_{LM}\omega^2}{12} - \frac{T_{LM}^3\omega^4}{720} - \frac{T_{LM}^5\omega^6}{30240}\right)\Phi_{LM}(\omega) = i\omega\Phi(\omega) \quad (34)$$

Using this expression, a Finite Impulse Response (FIR) filter is synthesized that converts the measured phase at the Laser Monitor detector into the derivative of the laser phase. The derivative of the laser phase is calculated in the time domain using:

$$\frac{1}{T_{LM}}\varphi_{LM}(t) - \frac{1}{2}\frac{d}{dt}\varphi_{LM}(t) + \frac{T_{LM}}{12}\frac{d^2}{dt^2}\varphi_{LM}(t) - \\ \frac{T_{LM}^3}{720}\frac{d^4}{dt^4}\varphi_{LM}(t) - \frac{T_{LM}^5}{30240}\frac{d^6}{dt^6}\varphi_{LM}(t) = \frac{d}{dt}\varphi(t) \quad (35)$$

Then the derivatives of $\phi_{snear}$ and $\phi_{sfar}$ are calculated simply by summing shifted versions of this phase. Of course, the Taylor expansion is one non-limiting example method of calculating the time-domain filter.

Figure 35:
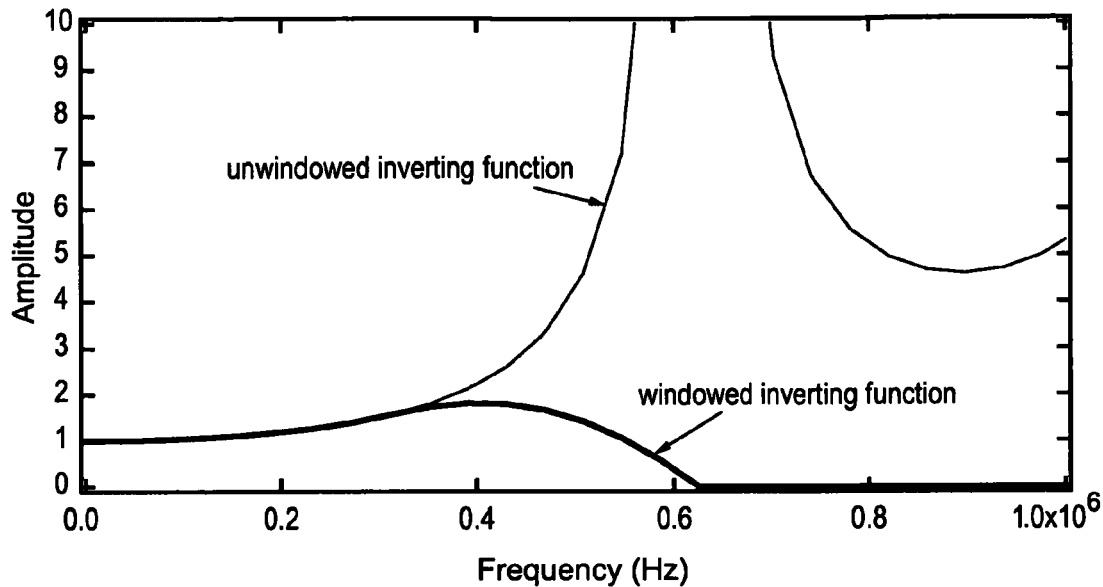
FIG. 35 is a graph of an example laser phase correction signal for a LM interferometer.
Figure 36:
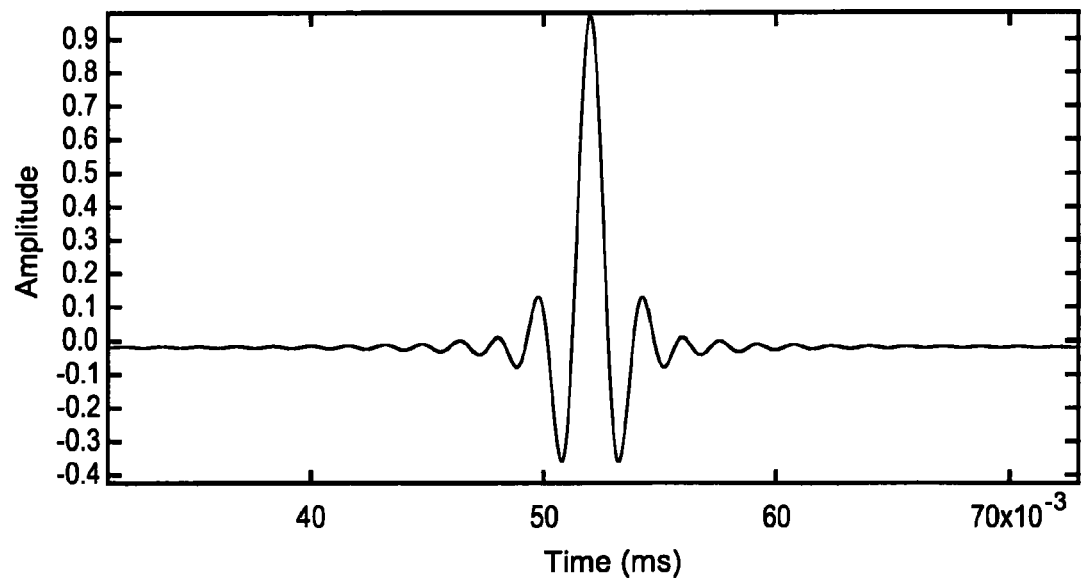
FIG. 36 is a graph of the impulse response obtained from a Fourier transform of the windowed phase correction function shown in FIG. 35.

Another method of designing the filter is to calculate the complex spectrum of the coefficients relating the LM phase to the laser phase shown above in equation 33. The expression is windowed to eliminate the poles as illustrated in the example in FIG. 35. The Figure plots the amplitude of the laser phase correction function in the frequency domain for a 1600 ns delay Laser Monitor Interferometer. There is a pole around 600 kHz, and the windowing is used to suppress the "explosion" of the function at that frequency. The expression is then Fourier transformed back into the time domain in order to obtain the coefficients of the FIR filter, as illustrated in FIG. 36. The Figure plots the impulse response obtained from the Fourier transform of the windowed phase correction function. These values are the coefficients on the FIR filter used to correct the signal from the Laser Monitor Interferometer to form the laser phase signal. When the data is windowed to eliminate the poles, the bandwidth of the transfer function is reduced—sometimes dramatically—greatly reducing the noise affecting the signal.

The phase signal calculated in this way will have a latency (delay from input to output in clock cycles) equal to the longest possible period of a cycle, which will occur at the slowest tuning rate of the laser, and the length of the FIR filter. All of the incoming signals will need to be delayed to match this latency.

2. DSP-Based Calculation of Near and Far Delay Phases

As in the numerical processing section above, the s and p channels have been constructed to be identical in delays are assumed, and we will therefore only treat the s terms, with the understanding that the p terms will be identical. The near and far phases are again described by:

$$\phi_{snear}(t) = \phi(t-\tau_{rn}) - \phi(t-\tau_n-\tau_{DUT}) \quad (36)$$

and, $$\phi_{sfar}(t) = \phi(t-\tau_{rf}) - \phi(t-\tau_f-\tau_{DUT}) - \phi(t-\tau_{sn}) + \phi(t-\tau_{sf}). \quad (37)$$

Figure 37:
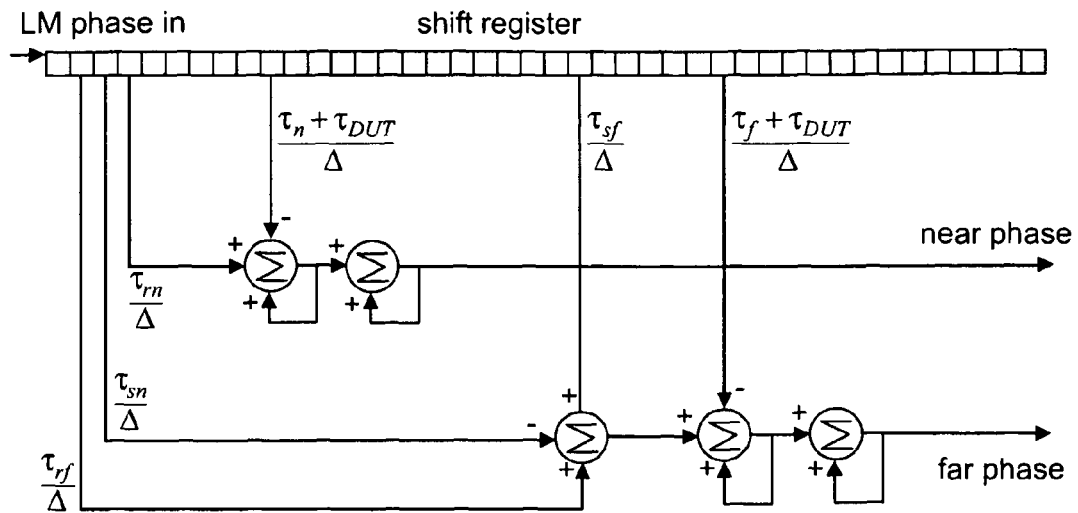
FIG. 37 is an example shift register for using in determining near and far phases from LM phase.

With the laser phase signal constructed, it is a simple process to construct the phases of the near and far delay terms. This construction may be achieved by implementing a box-car, or two-tap filter where the length of the filter, or, equivalently, the separation of the two taps is equal to the delay of the DUT location desired. FIG. 37 shows an implementation of this technique using a long, (e.g., 17,000 element), shift register with 6 taps. The optical and electronic design can be made so that the three front taps are set at zero, resulting in only three taps. The more general case, however is shown, along with the accumulators (the summers) that integrate the data so that the near phase and the far phase are obtained.

3. DSP-Based Mixing the Signal to Baseband

The mixing process is the same as described above in the numerical processing section. However, in this case, the sine and cosine calculations are replaced with sine and cosine look-up tables 166-172 shown in FIG. 30, and the multiplies perform using hardware multipliers 176-210 as shown in FIG. 30.

4. DSP-Based Low Pass Filtering and Decimation

The low pass filtering may be implemented with an FIR decimating filter. Decimating filters reduce the signal bandwidth and also lower the sampling rate. The reduced bandwidth no longer requires a high sample rate, and it is advantageous to operate on fewer samples if there is no loss in signal fidelity. Although this particular implementation of a decimating filter is described, any suitable filter may be used or designed.

Figure 38:
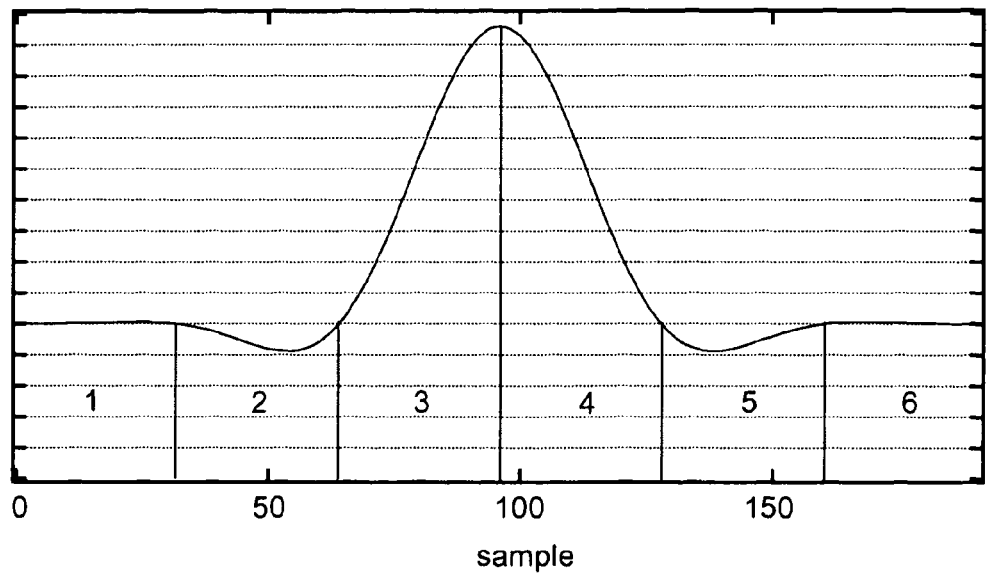
FIG. 38 is a graph of the a six-segmented Blackman Windowed Sync function.
Figure 39:
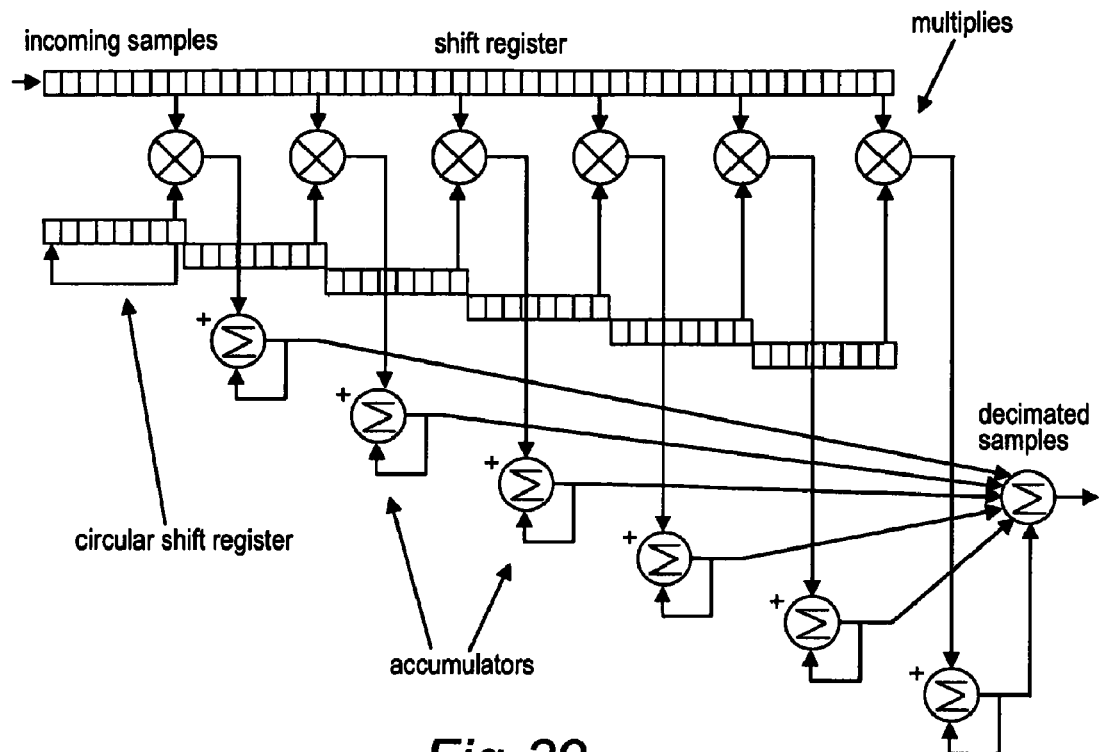
FIG. 39 is a function block diagram of a decimating six segment digital filter.

To obtain a sharp frequency filter cut-off, a Blackman Windowed Sync function is calculated for a decimation factor of 64, as shown in FIG. 38. The Figure shows a six-segmented Blackman Windowed Sync function. The digital value for each of these segments of the filter is loaded into the circular shift registers shown in FIG. 39. One non-limiting example implementation of this 6-segment digital filter with a decimation factor of 8 is shown in FIG. 39. The top shift register contains the digital product of the generated delay signal and the acquired signal. On each clock cycle, the digital number in each block advances one register position to the right. The smaller shift registers below contain the values of the segments shown in FIG. 38. The top shift register accepts the data coming out of the mixer. The multipliers multiply the incoming data by the coefficients held in the smaller circular shift registers, not shown here is the logic that triggers the output of a decimated sample every 8 clock cycles, and also clears all of the accumulators (sets to zero) so that the next sample can be calculated. On each clock cycle, each digital number moves one block to the right also, but because this is a circular register, the value on the far left is re-circulated to the first block. Also, on each clock cycle, the data in the blocks connected to the multiplier via arrows is multiplied together and added to the accumulator shown. After eight clock cycles, the value in all of the accumulators is summed to produce a single output sample. The accumulators are also cleared on this eight clock so that they can begin accumulation of the next sample on the next clock cycle.

The process steps 5 and 6 are performed as described above for the software-based numerical processing example embodiment.

Other Example Embodiments

Figure 40:
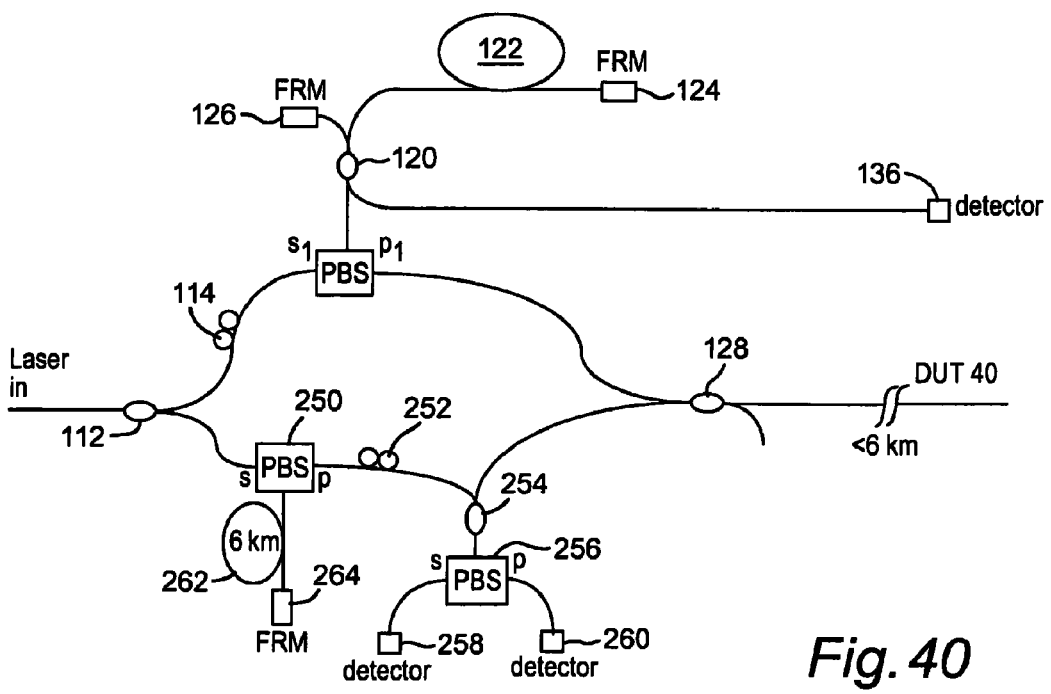
FIG. 40 is a schematic of a non-limiting example of an optical network with a delayed reference path.
Figure 41:
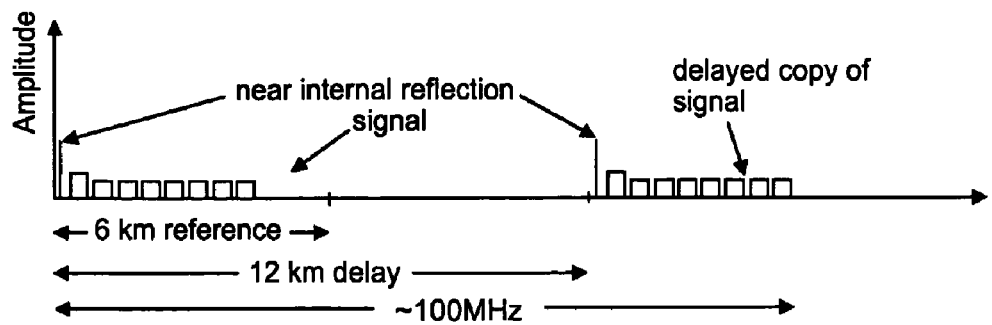
FIG. 41 is a graph that illustrates a signal delay DUT location for the optical network of FIG. 40.
Figure 42:
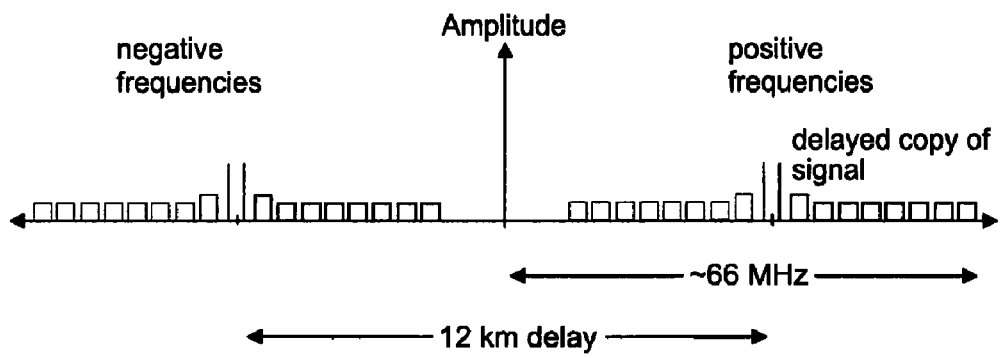
FIG. 42 is a graph that illustrates the positive and negative frequencies of the delays from FIG. 41.
Figure 43:
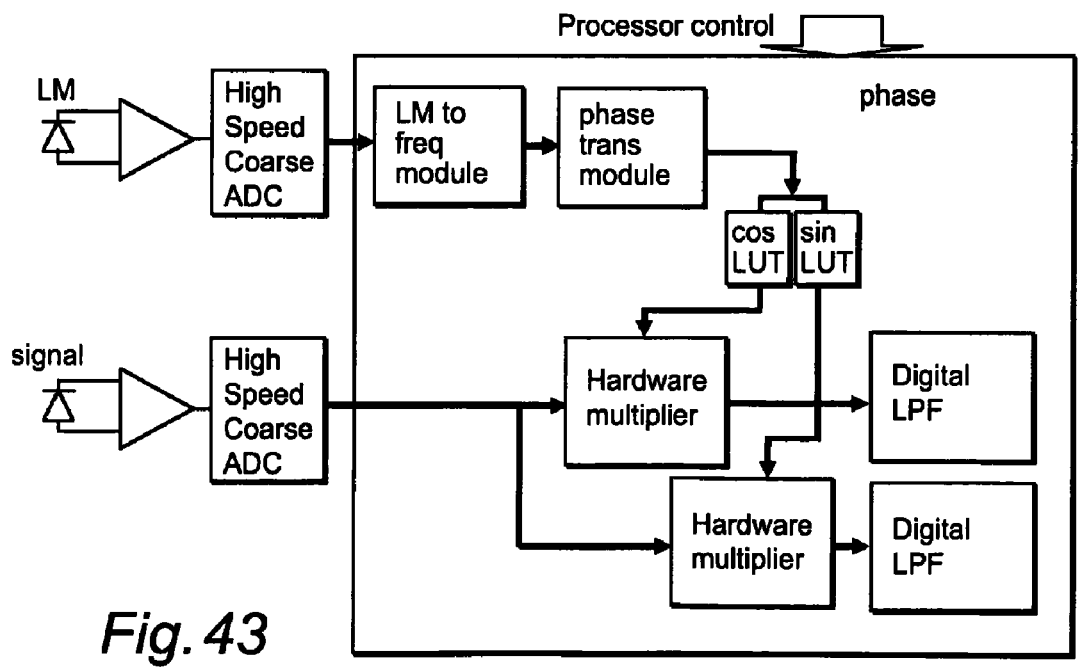
FIG. 43 illustrates a non-limiting example digital implementation for translation to baseband.

If bandwidth is a limiting factor, the optical network can be modified as shown in FIG. 40. In this embodiment, an additional delay line 262 has been added to the reference path. The length of this delay line is chosen such that the "near" reflections are mapped to negative frequencies, and the "far" terms remain mapped to positive frequencies. FIG. 41 shows the apparent location of the reflection features if one assumes a short (effectively zero) length reference path. Also shown is the overall bandwidth of the signal at 100 MHz for a 4 nm/sec tuning rate, and the apparent location of a 6 km reference delay. If we place a 6 km delay in the reference, then all frequencies are measured from this delay, and we end up with a signal spectrum like the one shown in FIG. 42, which is now noted to have a bandwidth of 66 MHz instead of 100 MHz.

Figure 44:
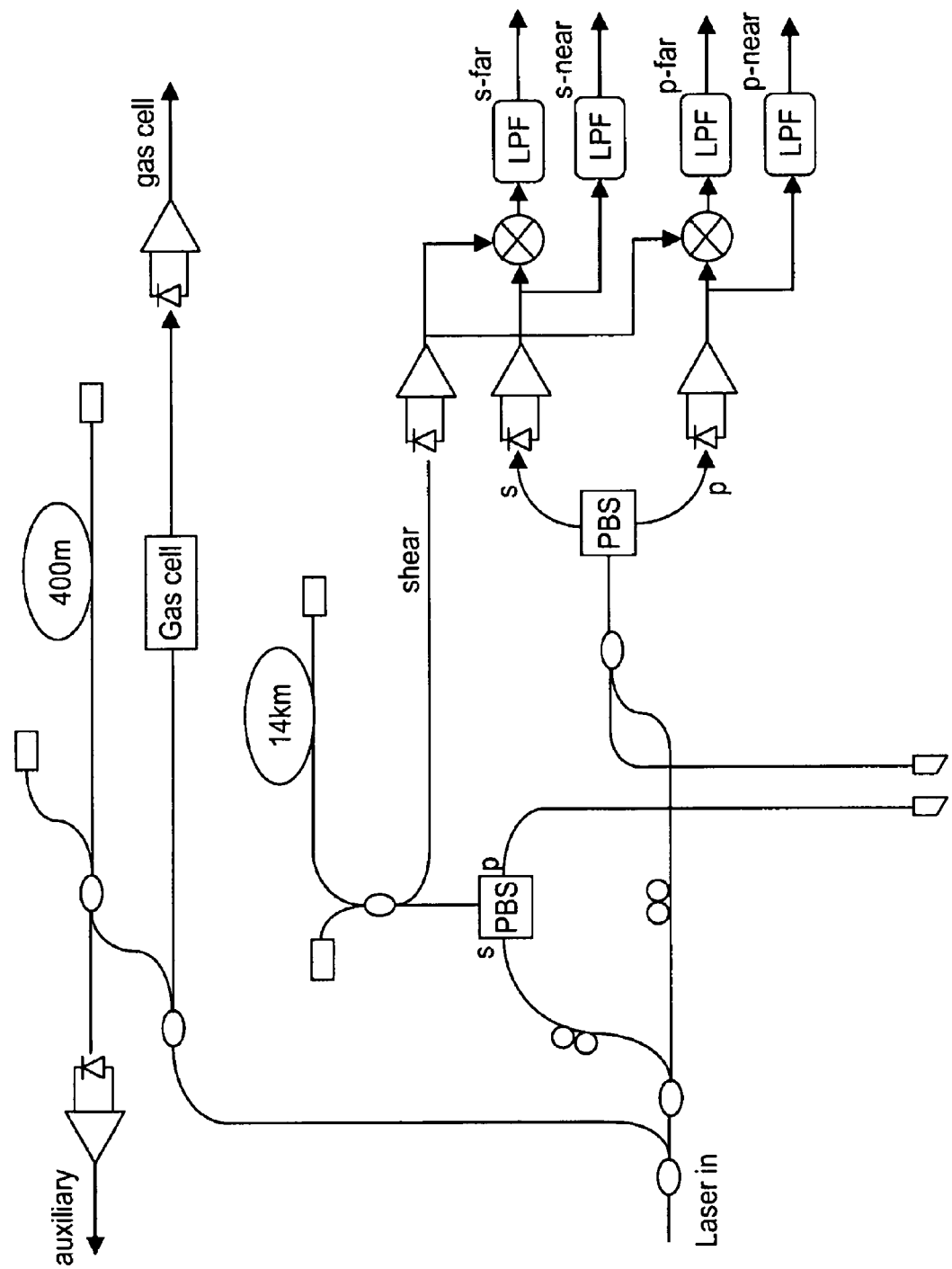
FIG. 44 a vibration correction network for transmission measurements.

It is also possible to implement the vibration tolerance technique without the use of an analog multiplier or mixer if the sampling frequency is sufficiently high. In that case, an optical network like the example shown in FIG. 44 may be advantageous because of the reduction in bandwidth required. In this example, a 120 Ms/s converter would be used to convert the combined near and far signals, and a hardware multiplier would be used to perform the mixing in a digital format. The signals could then be processed in an FPGA 166 similar to that described above, or just in the processor 156.

Example Applications

This measurement technique can be applied to many applications. For example, it can be applied to OFDR measurements of Rayleigh backscatter in optical fiber. Information about the local scatter intensity, phase, and time-variance of the phase will be available for each section along a DUT fiber including very long DUT fibers. This spatial resolution of the time-variant measurement is determined by the sweep-rate and the highest frequency of the acoustic signal present. Having the ability to accurately measure the spectrum of the Rayleigh scatter from an optical fiber has great utility, e.g., distributed temperature or strain sensing in high vibration or noisy environments (e.g., aircraft, power plants, ships, etc.). Further, immunity to time-varying effects of the fiber allows the laser scan rate to be slowed, increasing the operational distance range of the system. As a result, the acoustic immunity can be extended in the range of thousands of meters. This additional distance range is another important improvement in the utility of the instrument.

The use of Rayleigh scatter for the sensing means that every section of fiber is reflecting light at every point in the scan. Acoustic signals can then be measured throughout the duration of the scan. If the laser is scanned up and then down in a continuous triangle-wave fashion, then nearly continuous monitoring of the acoustic signals incident on the fiber can be achieved. Each one-meter section of fiber over a one-thousand meter length of optical fiber can then be used as an independent microphone. The distributed nature of the fiber acoustic sensing permits the fiber to be used as a phased acoustic array. In this way, acoustic signal processing can be used to locate and identify acoustic sources. Further, ambient sound can be used to form images of the surrounding physical features. Implementing a distributed acoustic sensor in a marine environment has great utility in the tracking of vessels and large animals (such as whales).

As another application, in many chemical processing facilities, temperature is a critical parameter. Knowledge of the temperature over a large volume has significant value. Due to turbulence in the fluids, these environments tend to be acoustically noisy. Here, then, immunity to vibration represents a significant improvement in utility.

In terrestrial applications, this complex acoustic sensing enabled by a phased array can be used for intrusion sensing in a room or around a perimeter. It can also be used to extract single sources among a cacophony of different sources that are spatially separated, such as an individual speaking in a crowded room. A further application would be an inexpensive, distributed seismograph.

If high resolution Rayleigh scatter measurements can be obtained over long distances (>100 meters) then scatter correlation, as described in provisional filing "Correlation and Keying of Rayleigh Scatter Measurements for Loss and Temperature Measurements" could be used as a security tool for identifying tampering in a fiber network (such as the addition of a small tap).

Although various embodiments have been shown and described in detail, the claims are not limited to any particular embodiment or example. None of the above description should be read as implying that any particular element, step, range, or function is essential such that it must be included in the claims scope. The scope of patented subject matter is defined only by the claims. The extent of legal protection is defined by the words recited in the allowed claims and their equivalents. No claim is intended to invoke paragraph 6 of 35 USC §112 unless the words "means for" are used.

The invention claimed is:

1. A method for processing interference pattern data generated by an interferometer, where the interferometer provides a laser signal from a tunable laser along a given optical path having an associated path delay and to a reference optical path and combines light reflected from the given optical path and from the reference path thereby generating the interference pattern data, comprising:
estimating a first laser optical phase of the laser signal;
calculating an expected complex response for the given optical path based on the estimated laser optical phase;
multiplying the interference pattern data from the interferometer by the expected complex response to generate a product; and
filtering the product to extract interference pattern data associated with the given optical path from the interference pattern data generated by the interferometer.

2. The method in claim 1, wherein the given optical path is associated with a device under test (DUT).

3. The method in claim 1, wherein the step of calculating an expected complex response for the given optical path based on the estimated laser optical phase further comprises:
estimating a delayed version of the laser optical phase of the laser signal;
determining a difference phase between the delayed version of the estimated laser optical phase and the estimated first laser optical phase; and
calculating the cosine of the difference phase to form the real part of the expected complex response; and
calculating the sine of the difference phase to form the imaginary part of the expected complex response.

4. The method in claim 3, further comprising:
low pass filtering and decimating the real and imaginary parts of the expected complex response to extract interference pattern data associated with the given optical path from the interference pattern data generated by the interferometer.

5. The method in claim 1, wherein estimating the laser optical phase includes:
coupling a portion of the laser light to a second interferometer;
converting an interference fringe signal from the second interferometer into a digital signal corresponding to the interference pattern data, the digital signal being a sampled form of the interference fringe signal;
estimating the laser phase based upon the digital signal.

6. The method in claim 5, further comprising:
estimating a first derivative of the laser optical phase based in the digital signal including:
Fourier transforming the digital signal;
windowing the transformed signal to identify a portion of the transformed signal that corresponds to the given optical path delay;
inverse Fourier transforming the windowed signal; and
computing the phase of the signal.

7. The method in claim 5, further comprising:
estimating a second derivative of the laser optical phase based upon the digital signals by identifying zero crossings of the digital signal, and
counting a number of samples between the zero crossings of the digital signal.

8. The method in claim 7, wherein the step of calculating an expected complex response for the given optical path based on the estimated laser optical phase further comprises:
estimating a delayed version of the second derivative of the laser optical phase;
calculating a running sum of the second derivative of the laser optical phase, where a length of the running sum is associated with a length of the given optical path delay;
accumulating the running sum;
calculating a sine of the accumulated sum to form the imaginary part of the expected complex response; and
calculating a cosine of the accumulated sum to form the real part of the expected complex response.

9. The method in claim 8, further comprising:
low pass filtering and decimating the real and imaginary parts of the expected complex response to extract interference pattern data associated with the given optical path from the interference pattern data generated by the interferometer.

10. Apparatus for processing interference pattern data generated by an interferometer, where the interferometer provides a laser signal from a tunable laser along a given optical path having an associated path delay and to a reference optical path and combines light reflected from the given optical path and from the reference path thereby generating the interference pattern data, comprising:
means for estimating a first laser optical phase of the laser signal;
means for calculating an expected complex response for the given optical path based on the estimated laser optical phase;
means for multiplying the interference pattern data from the interferometer by the expected complex response to generate a product; and
means for filtering the product to extract interference pattern data associated with the given optical path from the interference pattern data generated by the interferometer.

11. The apparatus in claim 10, wherein the given optical path is associated with a device under test (DUT).

12. The apparatus in claim 10, wherein the means for calculating an expected complex response for the given optical path based on the estimated laser optical phase further comprises:
means for estimating a delayed version of the laser optical phase of the laser signal;
means for determining a difference phase between the delayed version of the estimated laser optical phase and the estimated first laser optical phase; and
means for calculating the cosine of the difference phase to form the real part of the expected complex response; and
means for calculating the sine of the difference phase to form the imaginary part of the expected complex response.

13. The apparatus in claim 12, further comprising:
means for low pass filtering and decimating the real and imaginary parts of the expected complex response to extract interference pattern data associated with the given optical path from the interference pattern data generated by the interferometer.

14. The apparatus in claim 10, wherein means for estimating the laser optical phase includes:
means for coupling a portion of the laser light to the interferometer;
means for converting an interference fringe signal from the interferometer into a digital signal corresponding to the interference pattern data, the digital signal being a sampled form of the interference fringe signal;
means for estimating the laser phase based upon the digital signal.

15. The apparatus in claim 14, further comprising:
means for estimating a first derivative of the laser optical phase based in the digital signal including:
means for Fourier transforming the digital signal;
means for windowing the transformed signal to identify a portion of the transformed signal that corresponds to the given optical path delay;
means for inverse Fourier transforming the windowed signal; and
means for computing the phase of the signal.

16. The apparatus in claim 15, further comprising:
means for estimating a second derivative of the laser optical phase based upon the digital signals by identifying zero crossings of the digital signal, and
means for counting a number of samples between the zero crossings of the digital signal.

17. The method in claim 16, wherein the means for calculating an expected complex response for the given optical path based on the estimated laser optical phase further comprises:
means for estimating a delayed version of the second derivative of the laser optical phase;
means for calculating a running sum of the second derivative of the laser optical phase, where a length of the running sum is associated with a length of the given optical path delay;
means for accumulating the running sum;
means for calculating a sine of the accumulated sum to form the imaginary part of the expected complex response; and
means for calculating a cosine of the accumulated sum to form the real part of the expected complex response.

18. The apparatus in claim 17, further comprising:
means for low pass filtering and decimating the real and imaginary parts of the expected complex response to extract interference pattern data associated with the given optical path from the interference pattern data generated by the interferometer.

19. The apparatus in claim 10, wherein the means are implemented using a field programmable gate array.

20. The apparatus in claim 10, wherein the means are implemented using a software programmed data processor.

21. Apparatus for processing interference pattern data generated by an interferometer, where the interferometer provides a laser signal from a tunable laser along a given optical path having an associated path delay and to a reference optical path and combines light reflected from the given optical path and from the reference path thereby generating the interference pattern data, comprising electronic circuitry configured to:
estimate a first laser optical phase of the laser signal;
calculate an expected complex response for the given optical path based on the estimated laser optical phase;
multiply the interference pattern data from the interferometer by the expected complex response to generate a product; and
filter the product to extract interference pattern data associated with the given optical path from the interference pattern data generated by the interferometer.

22. The apparatus in claim 21, wherein the electronic circuitry is further configured to:
estimate a delayed version of the laser optical phase of the laser signal;
determine a difference phase between the delayed version of the estimated laser optical phase and the estimated first laser optical phase; and
calculate the cosine of the difference phase to form the real part of the expected complex response; and
calculate the sine of the difference phase to form the imaginary part of the expected complex response.

23. The apparatus in claim 22, wherein the electronic circuitry is further configured to:
low pass filter and decimate the real and imaginary parts of the expected complex response to extract interference pattern data associated with the given optical path from the interference pattern data generated by the interferometer.

* * * * *